United States Patent
Suzuki et al.

(10) Patent No.: US 8,037,984 B2
(45) Date of Patent: Oct. 18, 2011

(54) FOUR-WHEEL-DRIVE-VEHICLE DRIVING FORCE DISTRIBUTION APPARATUS

(75) Inventors: Satoru Suzuki, Kosai (JP); Tsutomu Suzuki, Kosai (JP); Yuzo Geshi, Kosai (JP); Hiroyuki Nakano, Kosai (JP); Kiyonori Hirao, Kosai (JP)

(73) Assignee: Univance Corporation, Shizuoka (JP)

( * ) Notice: Subject to any disclaimer, the term of this patent is extended or adjusted under 35 U.S.C. 154(b) by 800 days.

(21) Appl. No.: 11/798,415

(22) Filed: May 14, 2007

(65) Prior Publication Data

US 2007/0209462 A1    Sep. 13, 2007

(51) Int. Cl.
*B60W 10/02*    (2006.01)
*B60W 10/10*    (2006.01)

(52) U.S. Cl. .............. 192/3.56; 192/84.6; 74/337.5

(58) Field of Classification Search ........... 74/665 A; 192/3.56, 84.6
See application file for complete search history.

(56) References Cited

U.S. PATENT DOCUMENTS

| | | | | |
|---|---|---|---|---|
| 4,290,318 A * | 9/1981 | Ookubo et al. | ............. | 74/473.19 |
| 6,645,109 B2 | 11/2003 | Williams et al. | | |
| 6,802,794 B2 * | 10/2004 | Showalter | .............. | 475/269 |
| 7,240,577 B2 * | 7/2007 | Choi et al. | .............. | 74/337.5 |
| 2004/0163916 A1 | 8/2004 | Showalter | | |
| 2005/0113203 A1 | 5/2005 | Mueller et al. | | |
| 2005/0202919 A1 | 9/2005 | Mueller et al. | | |

FOREIGN PATENT DOCUMENTS

| | | |
|---|---|---|
| EP | 1 449 705 | 8/2004 |
| EP | 1 533 169 | 5/2005 |
| JP | 2004-514587 | 5/2004 |
| JP | 2004-249974 | 9/2004 |
| WO | 02/42663 | 5/2002 |

OTHER PUBLICATIONS

European Search Report mailed Oct. 18, 2007 for European Application No. 07009952.8-1254.

* cited by examiner

*Primary Examiner* — David D Le
*Assistant Examiner* — Ryan Dodd
(74) *Attorney, Agent, or Firm* — Wenderoth, Lind & Ponack, L.L.P.

(57) ABSTRACT

A four-wheel-drive-vehicle driving force distribution apparatus has an auxiliary transmission mechanism for switching motive power transmitted to an input shaft at least between two levels, a high speed and a low speed, and transmitting the motive power to a main output shaft; a friction clutch for selectively transmitting the motive power of the main output shaft to an auxiliary output shaft; a ball cam mechanism for changing the pressing force of the friction clutch in a non-step manner; and a shift mechanism for shifting the auxiliary transmission mechanism. A clutch control mechanism is provided between a drive member fixed to an output shaft of a motor and a pinion gear and changes the clutch pressing force caused by the ball cam mechanism corresponding to clockwise rotation of the drive member performed by a motor starting from a control starting point. A shift control mechanism is provided between the drive member and a shifting cylindrical cam and alternately repeating switching between a H position and a L position of the auxiliary transmission mechanism in every counterclockwise reciprocating rotation of the drive member performed by the motor starting from the control starting point.

8 Claims, 21 Drawing Sheets

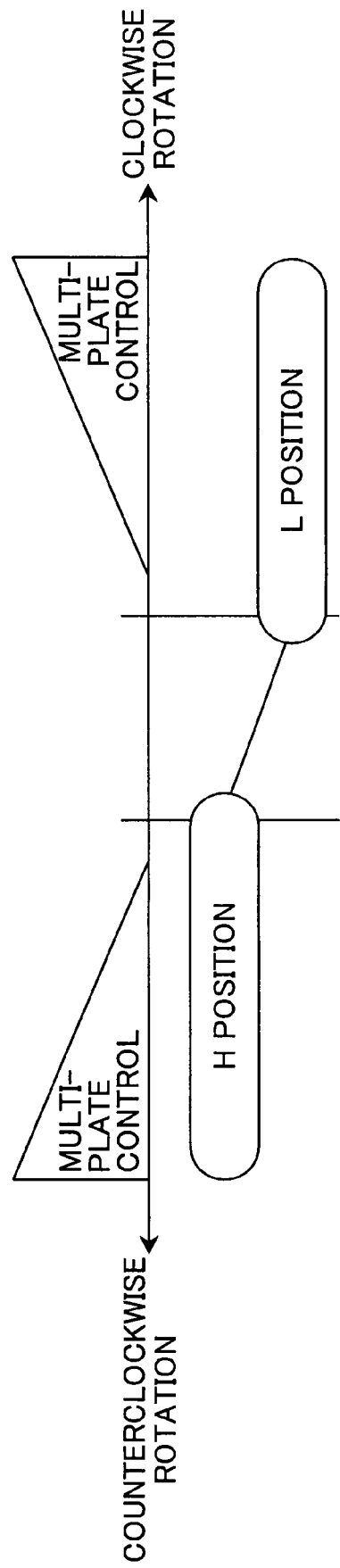

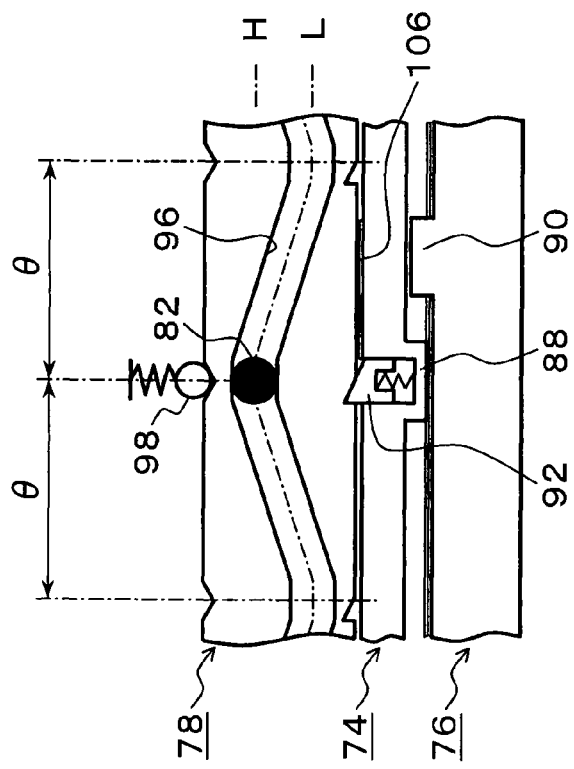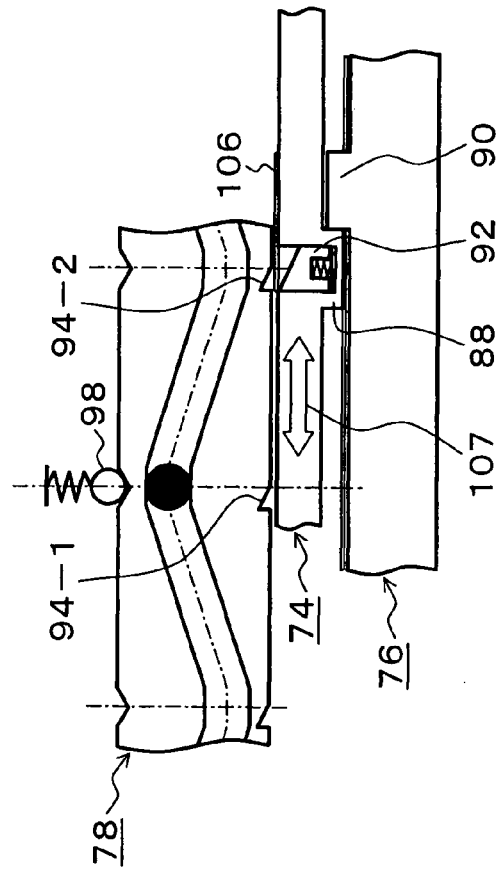
FIG. 9A
CONTROL STARTING POINT
FIG. 9B
CLUTCH CONTROL

CONTROL STARTING POINT

SHIFT SWITCH
(FORWARD ROTATION)

SHIFT SWITCH
(BACKWARD ROTATION)

SHIFT SWITCH END
(RETURN TO CONTROL STARTING POINT)

CONTROL STARTING POINT

MOVE TO STARTING POINT OF CLUTCH CONTROL

CLUTCH CONTROL

CONTROL STARTING POINT

SHIFT SWITCH
(FORWARD ROTATION)

REACHED TO SHIFT POSITION

SHIFT SWITCH (BACKWARD ROTATION)

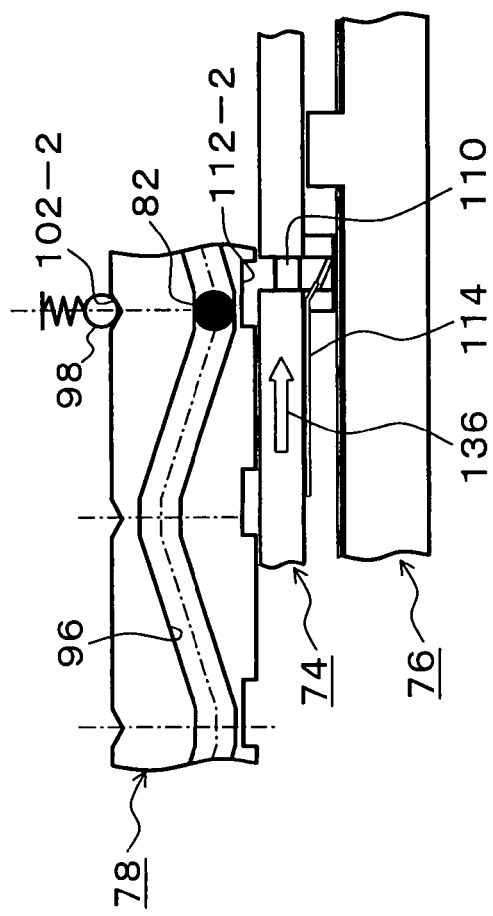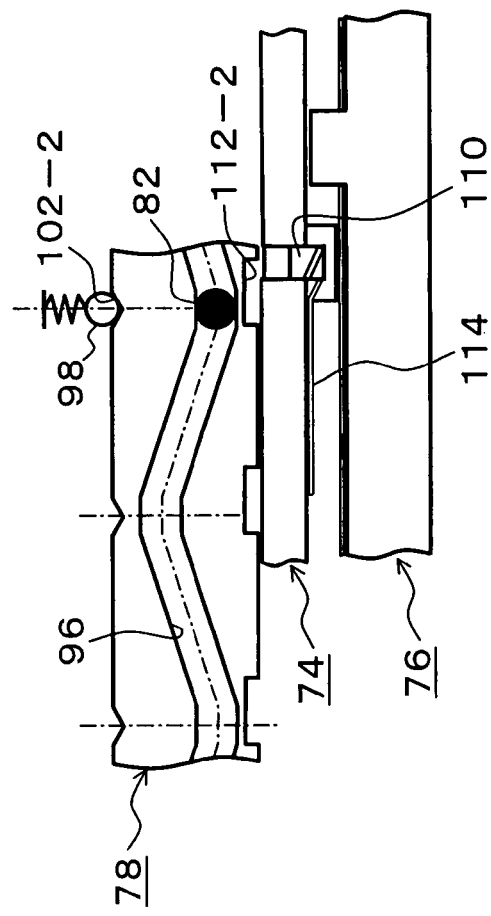
FIG. 15E
SHIFT SWITCH
(MIDDLE OF BACKWARD ROTATION)
FIG. 15F
SHIFT SWITCH END
(RETURN TO CONTROL STARTING POINT)

CONTROL STARTING POINT

SHIFT SWITCH (FORWARD ROTATION)

SHIFT SWITCH (MIDDLE OF FORWARD ROTATION)

RETURN DURING SHIFT

RETURN DURING SHIFT

FOUR-WHEEL-DRIVE-VEHICLE DRIVING FORCE DISTRIBUTION APPARATUS

BACKGROUND OF THE INVENTION

1. Field of the Invention

The present invention relates to a four-wheel-drive-vehicle driving force distribution apparatus for switching an auxiliary transmission mechanism and changing the pressing force of a friction clutch, which transmits motive power to front wheels, in a non-step manner and, particularly, relates to a four-wheel-drive-vehicle driving force distribution apparatus for switching the auxiliary transmission mechanism and changing the pressing force of the friction clutch by one motor.

2. Description of the Related Arts

Conventionally, in a driving force distribution apparatus for a four-wheel-drive vehicle having an auxiliary transmission mechanism and a friction clutch which controls torque distribution to front wheels in a non-step manner, switching of the auxiliary transmission mechanism and pressing force control of the friction clutch has been performed by one motor (actuator).

For example, in the drive force distribution apparatus of Japanese Kohyo Patent Publication No. 2004-514587 for a four-wheel-drive vehicle, a mechanism which switches output directions of a motor by an electromagnetic clutch when switching of an auxiliary transmission mechanism is to be performed or when control of a friction clutch is to be performed is provided so as to perform the switching and control by one motor. In the driving force distribution apparatus of U.S. Pat. No. 6,645,109 for a four-wheel-drive vehicle, a shift fork for switching an auxiliary transmission mechanism and a pinion gear for driving a ball cam are fixedly disposed coaxially on a drive shaft which is driven by a motor, and pressing force of a friction clutch is controlled by drive of the ball cam in the rotation area in which a shift groove of the cylindrical cam is not displaced by rotation. Furthermore, in the driving force distribution apparatus of Japanese Patent Application Laid-Open (kokai) No. 2004-249974 for a four-wheel-drive vehicle, a shift fork for switching auxiliary transmission mechanism and a pinion gear for driving a ball cam are fixedly disposed coaxially on a drive shaft, which is driven by a motor, so that the shift fork and the pinion gear are driven with a certain angle of looseness by cam followers provided on the motor drive shaft. However, such conventional driving force distribution apparatuses for four-wheel-drive vehicles have the following problems. The driving force distribution apparatus of Japanese Kohyo Patent Publication No. 2004-514587 for a four-wheel-drive vehicle has a problem that the cost thereof is high since the electromagnetic clutch is needed, although the apparatus can be made with one motor. The driving force distribution apparatus of U.S. Pat. No. 6,645,109 for a four-wheel-drive vehicle can perform switching of the auxiliary transmission mechanism and control of the friction clutch by one motor without using an electromagnetic clutch. Generally, in switching of the auxiliary transmission mechanism, the situation that the meshing phases of clutch gears are misaligned and the shift fork cannot be moved to a predetermined position may occur. However, in U.S. Pat. No. 6,645,109, since the shift fork is directly driven by the cylindrical cam provided on the drive shaft, there is a crucial problem that shifting cannot be performed when the clutch gear meshing phases of the auxiliary transmission mechanism are misaligned. Moreover, since the cylindrical cam for shifting and the pinion gear for driving the friction clutch are integrally rotated, the gear for driving the friction clutch is rotated even during a shifting period. Therefore, there is a problem that the size of the drive gear for the ball cam mechanism and cost are increased. The drive force distribution apparatus of Japanese Patent Application Laid-Open (kokai) 2004-249974 for a four-wheel-drive vehicle has a crucial problem that shifting cannot be performed when the clutch gear meshing phases of the auxiliary transmission mechanism are misaligned since the shift fork is directly driven by the cam followers which are provided on the drive shaft. Regarding shift control and friction clutch control, when the drive angle that is used for obtaining the same control force is increased, the drive torque of the motor can be reduced. However, in Japanese Patent Application Laid-Open (kokai) 2004-249974, the structure thereof utilizes cam surfaces provided on shift fork end faces. Therefore, the torque of the motor has to be increased since there is a restriction that the rotation angle of the drive shaft cannot be increased more than 360 degrees, and there is a problem that the size of the motor is increased which leads to increased cost. Furthermore, as a problem common to U.S. Pat. No. 6,645,109 and Japanese Patent Application Laid-Open (kokai) 2004-249974, as shown in FIG. 1, in order to perform pressing force control of the friction clutch with respect to both a H position and a L position of the shift of the auxiliary transmission mechanism, a drive gear of the ball cam mechanism for changing the pressing force of the friction clutch has to be driven in both directions, forward rotation and reverse rotation.

FIG. 2A shows a drive gear 202 of a ball cam mechanism 200 which changes clutch pressing force merely by rotation toward the H-position side of an auxiliary transmission mechanism. On the other hand, FIG. 2B shows a drive gear 204 of a ball cam mechanism 200 which changes clutch pressing force for both the H position and the L position, wherein there is a problem that the size of the gear part and the weight thereof is increased, and cost is also increased. In addition, there is also a problem that the gear part cannot be accommodated in a case.

SUMMARY OF THE INVENTION

According to the present invention a driving force distribution apparatus for a four-wheel-drive vehicle is provided which is capable of independently controlling shift switching control of an auxiliary transmission mechanism and control of a pressing force of a friction clutch by one motor without mutual interference therebetween and realizes reduction in size, weight, and cost.

The present invention provides a four-wheel-drive-vehicle driving force distribution apparatus. More specifically, in the present invention, a four-wheel-drive-vehicle driving force distribution apparatus having an auxiliary transmission mechanism for switching motive power transmitted to an input shaft at least between two levels, a high speed and a low speed, and transmitting the motive power to a main output shaft and a friction clutch for selectively transmitting the motive power of the main output shaft to an auxiliary output shaft, is characterized by having:

a motor;

a ball cam mechanism for changing the pressing force of the friction clutch in a non-step manner corresponding to rotation of a pinion gear which is rotatably and coaxially disposed on an output shaft of the motor;

a shift mechanism for converting rotation of a shifting cylindrical cam which is rotatably and coaxially disposed on the output shaft of the motor into linear shift motion and shifting the auxiliary transmission mechanism;

a drive member fixed to the output shaft of the motor;

a clutch control mechanism provided between the drive member and the pinion gear for changing clutch pressing force caused by the ball cam mechanism corresponding to rotation of the drive member in a first direction caused by the motor starting from a control starting point; and a shift control mechanism provided between the drive member and the shifting cylindrical cam for cyclically repeating transmission of the auxiliary transmission mechanism performed by the shift mechanism in every reciprocating rotation of second direction rotation starting from the control starting point of the drive member performed by the motor.

Herein, the clutch control mechanism, a drive projection is formed on an end surface of the drive member in the pinion gear-side, a driven projection is formed on an end face of the pinion gear in the drive member-side, the drive projection is caused to abut the driven projection by rotation of the drive member in the first direction from the control starting point and rotate the pinion gear in the first direction, and the pinion gear is rotated to return by reaction force of the friction clutch in return rotation of the drive member to the control starting point.

The shift control mechanism has a ratchet attached to the drive member and a ratchet groove formed on an end face of the shifting cylindrical cam in the drive member-side; wherein, in forward rotation of the drive member in the second direction, the ratchet is engaged with the ratchet groove so as to rotate the shifting cylindrical cam and switch a current shift position to a next shift position; and, in return rotation, the ratchet is removed from the ratchet groove so as to return the drive member to the control starting point while the shifting cylindrical cam remains at the position.

The shift control mechanism has a shutter member for housing the ratchet so as to prevent engagement between the ratchet and the ratchet groove when the drive member is rotated in the first direction so as to operate the clutch control mechanism.

When the number of switching levels of the auxiliary transmission mechanism is N, the ratchet groove is provided at N locations at an angle interval of θ which is 360° divided by the number of switching levels N starting from the control starting point, and an outer peripheral cam groove for changing a shift position by the interval angle θ is formed on the outer periphery of the shifting cylindrical cam.

When the number of switching levels of the auxiliary transmission mechanism is two, high and low, two ratchet grooves are provided on an end face of the shifting cylindrical cam at an interval of 180° starting from the control starting point, and an outer peripheral cam groove for changing a high-speed shift position and a low-speed shift position is formed on the outer periphery of the shifting cylindrical cam at an interval of 180°.

Another embodiment of the shift control mechanism has a slide key attached to the drive member and retained at a retracted position by a built-in spring;

an engagement groove which is formed on the end face of the shifting cylindrical cam in the drive member-side and to be engaged with the slide key; and a shift control plate for, in forward rotation of the drive member in the second direction, pressing a rear portion of the slide key so as to rotate the shifting cylindrical cam in the state in which a distal end of the key is engaged with the engagement groove so as to switch a current shift position to a next shift position; causing the slide key to return to the retracted position at the next shift position and causing merely the drive member to return to the control starting point in the state in which the slide key is removed from the slide groove; and, when the drive member is to be returned to the control starting point during the forward rotation to the next shift position, causing the shifting cylindrical cam to return to the control starting point in the state in which engagement between the slide key and the engagement groove is maintained.

Also for the shift control mechanism, when the number of switching levels of the auxiliary transmission mechanism is N, the engagement groove is provided at N locations at an angle interval of θ which is 360° divided by the number of switching levels N starting from the control starting point, and an outer peripheral cam groove for changing a shift position by the interval angle θ is formed on the outer periphery of the shifting cylindrical cam. For example, when the number of switching levels of the auxiliary transmission mechanism is two, high and low, two engagement grooves are provided on an end face of the shifting cylindrical cam at an interval of 180° starting from the control starting point, and an outer peripheral cam groove for changing a high-speed shift position and a low-speed shift position is formed on the outer periphery of the shifting cylindrical cam at an interval of 180°.

The shift mechanism has a shift waiting mechanism between the shift control mechanism and the shift mechanism.

According to the present invention, switching of the auxiliary transmission mechanism and torque control of the friction clutch can be performed by one motor without using an electrical switching means such as an electromagnetic clutch; therefore, cost can be reduced compared with the cases in which motors are separately provided for shifting of the auxiliary transmission mechanism and torque control of the friction clutch. The pressing force of the friction clutch can be changed by the rotation in one direction, for example, clockwise rotation with respect to the control starting point, and high/low switching of the auxiliary transmission mechanism can be performed, for example, by counterclockwise reciprocating rotation. Therefore, even though they are driven by the same motor, the shift control and the torque control of the friction clutch can be independently performed depending on the rotation directions, and optimal control conditions can be individually determined. Moreover, since the waiting mechanism is provided in the shift mechanism of the auxiliary transmission mechanism, the shifting operation can be completed even when meshing phases of the clutch gears are misaligned. Regardless of the shift positions of the auxiliary transmission mechanism, torque of the friction clutch can be controlled by changing the rotation direction, and the driving gear of the ball cam mechanism is always used in the rotation of one direction by the pinion gear. Therefore, reduction in size and weight can be realized, and cost is also reduced. Furthermore, in addition to the H position and the L position as the number of shifting levels of the auxiliary transmission mechanism, third and fourth positions such as neutral and 4WD lock can be readily set. The above and other objects, features, and advantages of the present invention will become more apparent from the following detailed description with reference to the drawings.

BRIEF DESCRIPTION OF THE DRAWINGS

FIG. 1 is an explanatory drawing of conventional control of performing shift control and clutch control corresponding to motor rotation;

FIGS. 9A and 9B are explanatory drawings of clutch control in FIG. 8;

FIGS. 15D to 15F are explanatory drawings of shift control subsequent to FIG. 15C.

DETAILED DESCRIPTION OF THE INVENTION

Figure 3:
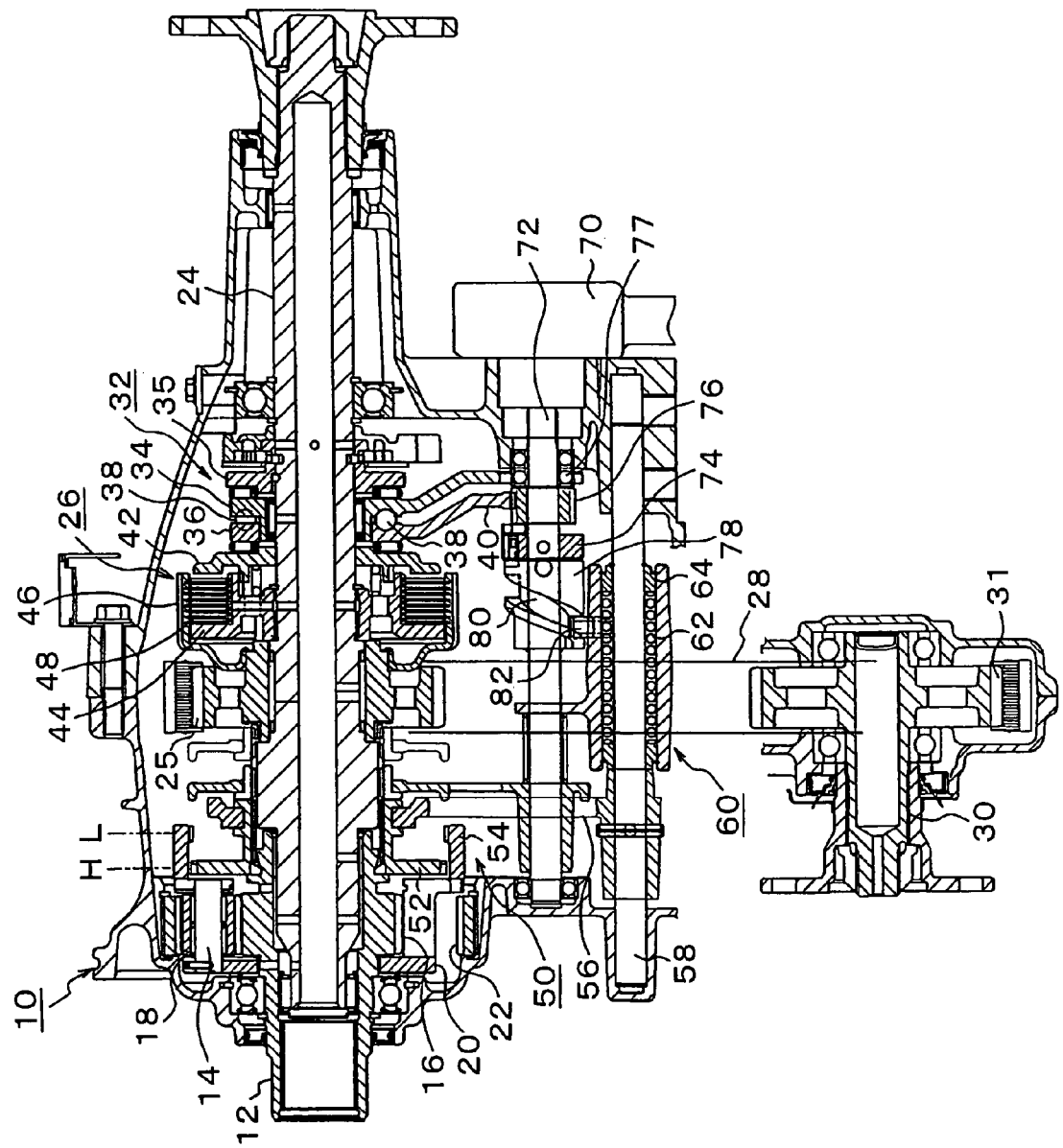
FIG. 3 is a cross sectional view showing an embodiment of a four-wheel-vehicle driving force distribution apparatus according to the present invention.
Figure 4:
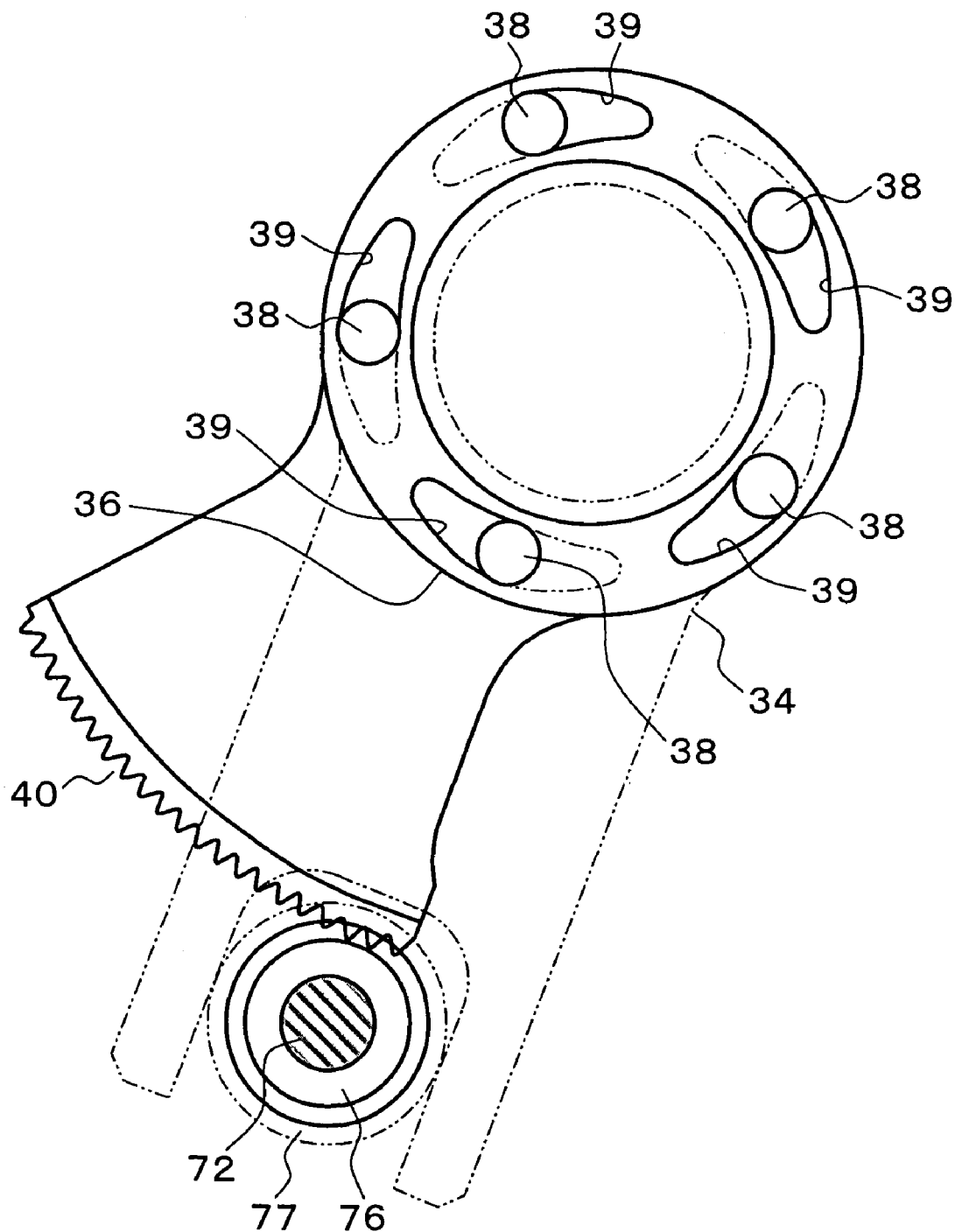
FIG. 4 is an explanatory drawing of a ball cam mechanism of FIG. 3 viewed from the axial direction in an exploded manner.

FIG. 3 is a cross sectional view showing an embodiment of a four-wheel-drive-vehicle driving force distribution apparatus according to the present invention. In FIG. 3, the four-wheel-drive-vehicle driving force distribution apparatus of the present embodiment has a case 10, an input shaft 12 which inputs motive power from an engine to the left side of the case 10 via an automatic transmission or a manual transmission is provided, and the input shaft 12 is coupled to a rear-wheel output shaft 24, which is coaxially disposed and serving as a main output shaft, via an auxiliary transmission mechanism 14. The auxiliary transmission mechanism 14 is a planetary gear mechanism having a sun gear 16, a planetary gear 18 provided on a carrier case 20, and a ring gear 22. A clutch gear 54 is provided integrally with the carrier case 20, and, corresponding to that, a shift gear 52 which can perform shift operation is disposed. The auxiliary transmission mechanism 14 performs switching between a H position and a L position. When the shift gear 52 is at the position shown in the drawing, the H position is attained, and the sun gear 16 is directly connected to the rear-wheel output shaft 24. The position at which the shift gear 52 is meshed with the clutch gear 54 is the L position, wherein the ring gear 22 is fixed, and the input rotation of the sun gear 16 is transmitted to the rear-wheel output shaft 24 via the clutch gear 54 and then the shift gear 52 as rotation of the carrier case 20 having the planetary gear 18. A friction clutch 26 is provided coaxially with the rear-wheel output shaft 24. The friction clutch 26 fixes a clutch hub 44 to the rear-wheel output shaft 24 and couples a clutch drum 46 to a sprocket gear 25 which is rotatably provided with respect to the rear-wheel output shaft 24. In parallel with the rear-wheel output shaft 24, a front-wheel output shaft 30 serving as an auxiliary output shaft which outputs motive power to the other side is provided on the case 10, a sprocket gear 31 is integrally formed with the front-wheel output shaft 30, and a chain belt 28 is wound around the gear and the sprocket gear 25 of the friction clutch 26 side so as to couple them. In such four-wheel-drive-vehicle driving force distribution apparatus, upon two-wheel drive, a multi-plate clutch 48 provided between the clutch hub 44 and the clutch drum 46 of the friction clutch 26 is separated, and the rotation of the input shaft 12 is transmitted to the rear-wheel output shaft 24 via the auxiliary transmission mechanism 14. Upon four-wheel drive, the friction clutch 26 attains a connected state, and the motive power from the input shaft 12 is also transmitted to the front-wheel output shaft 30 via the rear-wheel output shaft 24, the friction clutch 26, the sprocket gear 25, the chain belt 28, and the sprocket gear 31. With respect to the friction clutch 26, a ball cam mechanism 32 which controls the clutch pressing force (transmitted torque) of the multi-plate clutch 48 provided between the clutch hub 44 and the clutch drum 46 in a non-step manner is provided. As shown in the explanatory drawing of FIG. 4 viewed in the axial direction, the ball cam mechanism 32 retains balls 38 sandwiched between ball cam grooves 39 of opposing cam surfaces of a fixed cam plate 34 and a rotating cam plate 36 which are provided coaxially with the rear-wheel output shaft 24. The fixed cam plate 34 has an arm portion 37 extended toward a motor output shaft 72, wherein a U-shaped distal end thereof is engaged with the outside of a bearing 77 so as to stop rotation. The rotating cam plate 36 has a drive gear 40 extended toward the motor output shaft 72 and engaged with a pinion gear 76, and the drive gear 40 has a sector-like end face shape. Referring again to FIG. 3, a fixed plate 35 is disposed in the right side of the fixed cam plate 34 via a thrust bearing, and a pressing member 42 is disposed in the left side of the rotating cam plate 36 via a thrust bearing. In the ball cam mechanism 32, when the rotating cam plate 36 is driven by the drive gear 40 to rotate in a certain direction with respect to the fixed cam plate 34, the pressing member 42 receives the pressing force caused by the balls 38 in the ball cam grooves 39, which are curved grooves of opposing surfaces, and is pressed in the axial direction, and presses the multi-plate clutch 48 of the friction clutch 26, thereby increasing the clutch pressing force corresponding to the rotation amount of the drive gear 40. A motor 70 is provided as a drive source which controls a shift mechanism 50 of the auxiliary transmission mechanism 14 and the pressing force of the friction clutch 26. The motor 70 transmits the rotation generated by a built-in reduction gear to the motor output shaft 72. A drive member 74, a pinion gear 76, and a shifting cylindrical cam 78 which constitute the clutch control mechanism of the friction clutch 26 and the shift control mechanism of the auxiliary transmission mechanism 14, which will be elucidated in the below description, are disposed coaxially on the motor output shaft 72. The drive member 74 is fixed to the motor output shaft 72, and, with respect to that, the pinion gear 76 and the shifting cylindrical cam 78 are relatively-rotatably attached to the motor output shaft 72. At a predetermined position serving as a control starting point, the drive member 74 is not coupled to the pinion gear 76 and the shifting cylindrical cam 78. When the motor output shaft 72 is rotated, for example, clockwise starting from the control starting point, the rotation of the drive member 74 is transmitted to the pinion gear 76, and the drive gear 40 is driven by the rotation of the pinion gear 76, thereby operating the ball cam mechanism 32 and changing the pressing force of the friction clutch 26. When the drive member 74 is rotated in the opposite direction, for example, counterclockwise, starting from the control starting point by the motor output shaft 72, the rotation of the drive member 74 is transmitted to the shifting cylindrical cam 78, and the shifting cylindrical cam 78 is rotated. Consequently, a shift pin 82 is guided and moved in the axial direction by a shifting cam groove 96 formed on the outer periphery thereof, and, for example, the shift pin 82 is moved from the shown H position in the auxiliary transmission mechanism 14 toward the right so as to perform the switch to the L position. Regarding the shift operation which is caused by the rotation of the shifting cylindrical cam 78 along with the counterclockwise rotation of the drive member 74, one shift operation is completed when the drive member 74 is rotated in the opposite direction to return to the control starting point after the switching to the shift position is completed. Upon the return from the shift position, the shifting cylindrical cam 78 remains at the shift switched position, and merely the drive member 74 is rotated to return to the control starting point. Therefore, in the switching operation caused by rotating the shifting cylindrical cam 78 by the drive member 74, one shift operation is completed by repeatedly rotating the member counterclockwise or forward and then backward (return rotation). A waiting mechanism 60 is provided between the shift pin 82, which is shifted in the axial direction by the shifting cylindrical cam 78, and a shift fork 56. The waiting mechanism 60 is disposed in the right side of the shift fork 56, which is fixed to a shift rod 58, and a stopper ring 64 is inserted in the right side of a built-in spring 62 so as to fix it. When a shift operation of the shift pin 82 is performed, the shift gear 52 and the clutch gear 54 are sometimes in the positional relation that they are not meshed with each other. In this case, the waiting mechanism 60 compresses the spring 62 by a shift operation of the shift pin 82, thereby attaining a waiting state in which the shift fork 56 is energized in the shift direction by the force of the spring 62. When the gears are to be meshed in this waiting state, a shift operation is performed by the force of the spring 62 so that the shift operation per se can be completed even when the gears are not meshed with each other.

Figure 5:
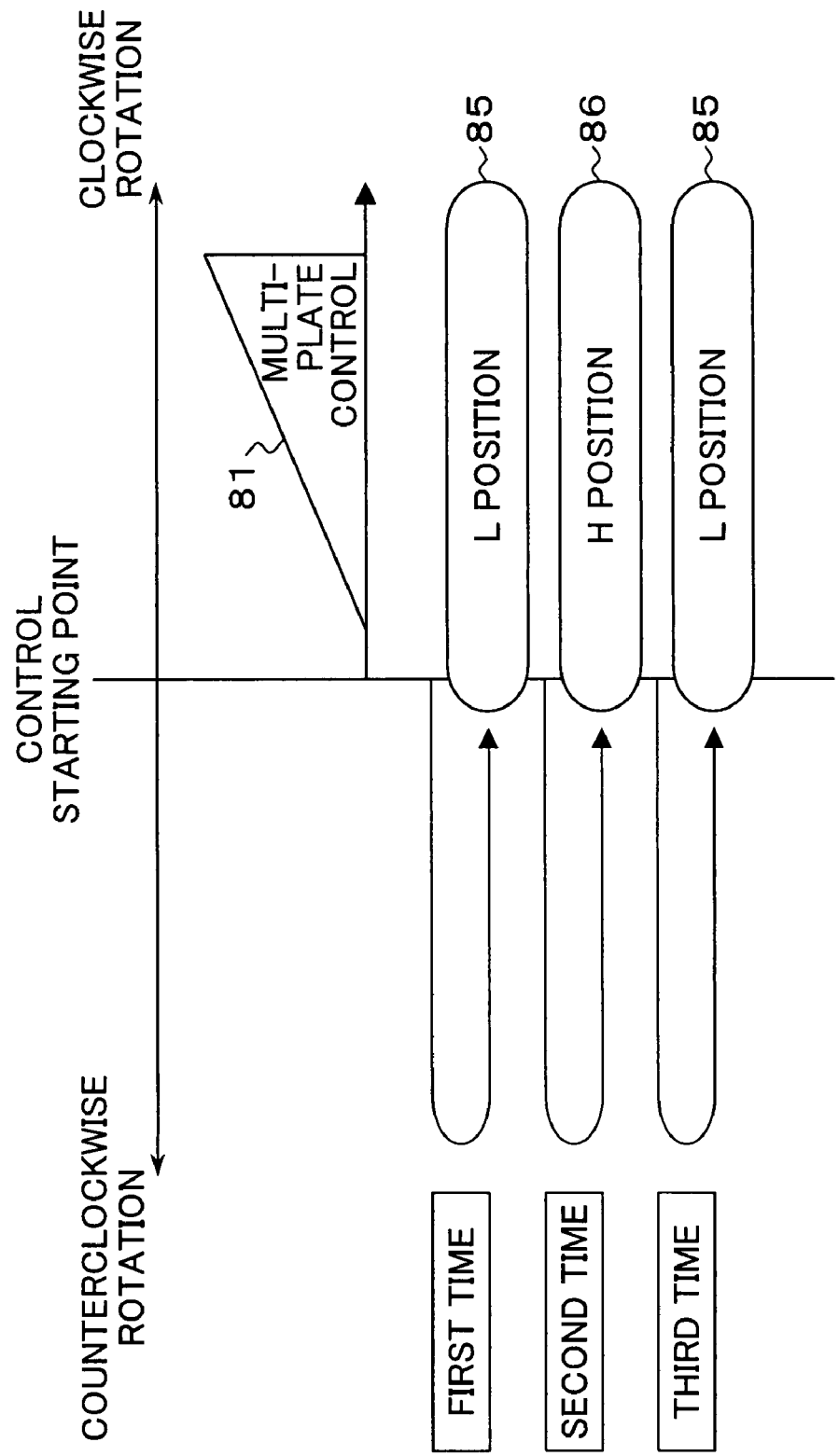
FIG. 5 is an explanatory drawing of clutch control and shift control with respect to the rotation directions of a motor output shaft of FIG. 3.

FIG. 5 is an explanatory diagram of the clutch control and the shift control with respect to the rotation directions of the motor output shaft 72 in the embodiment of FIG. 3. In FIG. 5, the motor output shaft 72 is positioned at the control starting point as an initial state, and clockwise rotation or counterclockwise rotation is performed with respect to the control starting point. The clutch control is performed by rotating the motor output shaft clockwise starting from the control starting point. When the motor output shaft 72 is rotated clockwise, the ball cam mechanism 32 operates, and, as shown by a clutch control characteristic 81, the pressing force of the friction clutch 26 is increased in a non-step manner corresponding to the amount of rotation. Meanwhile, in a shift operation of the auxiliary transmission mechanism 14, the motor output shaft 72 is rotated counterclockwise starting from the control starting point. In the present embodiment, since two-level switching between the H position and the L position is taken as an example of the switching of the auxiliary transmission mechanism 14, the angle θ of the counterclockwise rotation from the control starting point is 180° that is 360°, which is one rotation, divided by the number of switching levels N=2. Therefore, when the shaft is rotated by 180° counterclockwise starting from the control starting point wherein it is at the H position and, after the rotation, returned to the control starting point by rotating the shaft by 180° in the opposite direction, shift to the L position 85 is performed.

Figure 2A:
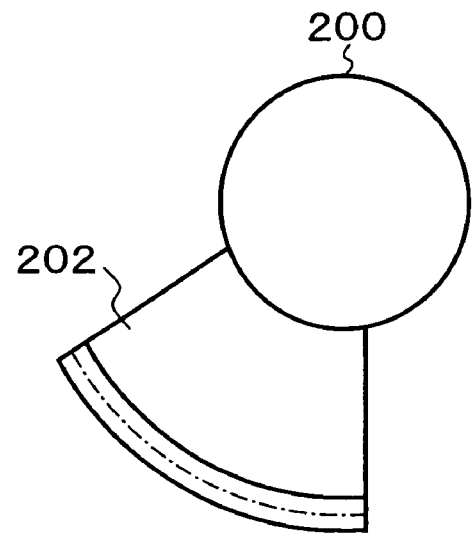
FIGS. 2A and 2B are explanatory drawings of the sizes of drive gears of a ball cam mechanism for clutch control in single shift of a H position and both-side shifting in the H position and a L position.
Figure 2B:
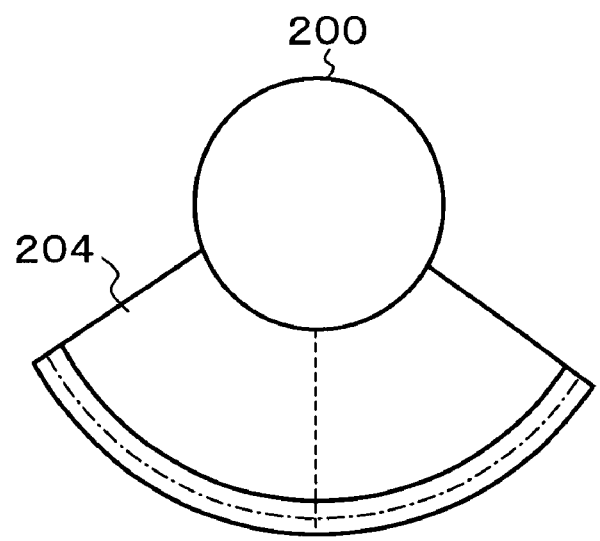

Then, when reciprocating rotation in which the shaft is rotated by 180° counterclockwise and then returned by 180° in the opposite direction is similarly performed, it is switched from the L position 85 to the H position 86. Furthermore, when third rotation control of rotating the shaft by 180° counterclockwise and returning the shaft by 180° in the opposite direction is performed, it is switched again from the H position 86 to the original L position 85. Hereinafter, when the reciprocating rotation of rotating the shaft forward toward the left by 180° starting from the control starting point and returning the shaft by 180° in the opposite direction is similarly repeated, switching of the H position and the L position can be sequentially repeated. As described above, in the clutch control and the shift control of the present invention performed by one motor 70, the clutch control is performed by clockwise rotation starting from the control starting point, the shift control is performed by counterclockwise rotation starting from the control starting point, each control can be performed by independent rotation control, and the clutch control and the shift control are not correlated. Therefore, control characteristics optimal for each of the control can be readily set. The control of the friction clutch 26 can be performed merely by changing the rotation directions to the opposite even when the shift mechanism is either at the L position or the H position, and the control of the friction clutch can be performed by the rotation in merely one direction. Therefore, as shown in FIG. 2A, the size of the drive gear 40 may be that corresponding to one-side shift, and the size and the weight of the drive gear 40 used in the present invention can be reduced compared with the conventional drive gear of FIG. 2B, in which the H position and the L position are determined by the rotation directions and clutch control is respectively performed, thereby reducing the cost.

Figure 6:
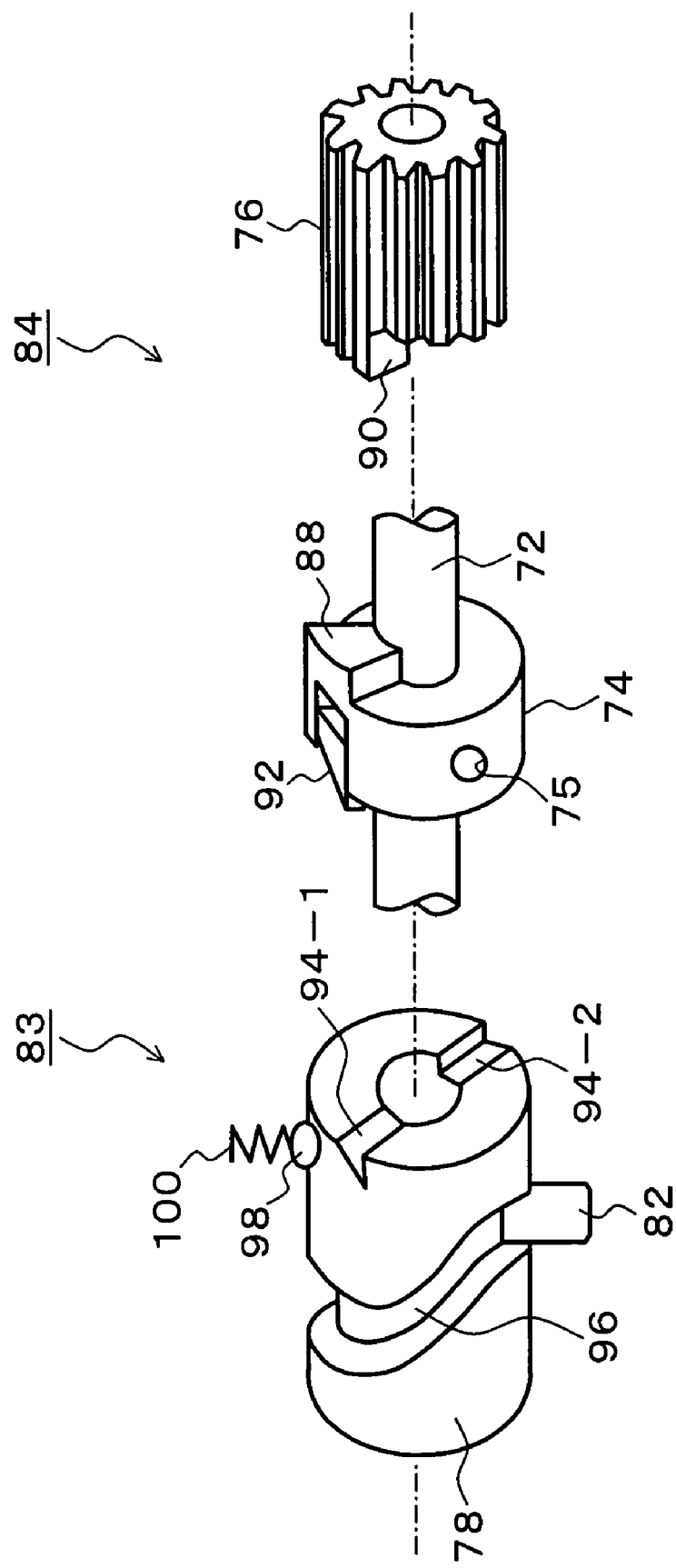
FIG. 6 is an explanatory drawing showing a clutch control mechanism and a shift control mechanism of FIG. 3 in an exploded manner.

FIG. 6 is an explanatory drawing showing the shift control mechanism and the clutch control mechanism in the embodiment of FIG. 3 in an exploded manner. In FIG. 6, the clutch control mechanism 84 comprises a drive projection 88 provided on the drive member 74 which is fixed to the motor output shaft 72 by a fixed pin 75 and a driven projection 90 provided on the pinion gear 76 which is rotatably disposed on the motor output shaft 72. At the control starting point, the driven projection 90 of the pinion gear 76 is in the non-driven state in which the end face thereof is not in contact with that of the drive projection 88 of the drive member 74. When the motor output shaft 72 is rotated clockwise in this state from the control starting point, a side surface of the drive projection 88 abuts a side surface of the driven projection 90 of the pinion gear 76, and the pinion gear 76 is rotated toward the right integrally with the drive member 74. Along with the rotation caused by the drive member 74 of the pinion gear 76, the drive gear 40 shown in FIG. 3 turns, the ball cam mechanism 32 is operated, and the pressing force of the friction clutch 26 is changed in a non-step manner as shown by the clutch control characteristic 81 of FIG. 5. Herein, reaction force of the friction clutch 26 of FIG. 3 is always applied to the pinion gear 76. Therefore, when the motor output shaft 72 is returned to the control starting point in order to cancel the clutch control, the pinion gear 76 receives the reaction force from the friction clutch 26 and is also returned to the control starting point. The shift control mechanism 83 comprises a ratchet 92 provided on the drive member 74 and the shifting cylindrical cam 78 which is rotatably provided on the motor output shaft 72. The ratchet 92 provided on the drive member 74 is pushed by a spring and incorporated in an axial-direction groove on the outer peripheral side thereof, and an edge-like claw portion at the distal end thereof protrudes to the outside. On the shifting cylindrical cam 78, ratchet grooves 94-1 and 94-2 are formed at two locations on the end face thereof in the drive member 74-side. The ratchet grooves 94-1 and 94-2 are formed on the end face with an interval of 180° since the number of switching levels of the auxiliary transmission mechanism 14 in the present embodiment is two, the H position and the L position, and the disposing angle θ of the ratchet grooves 94-1 and 94-2 with respect to the number of switching levels N is θ=360°/N=360°/2=180°. In addition, on the outer periphery of the shifting cylindrical cam 78, the shifting cam groove 96 is formed. The shifting cam groove 96 converts the rotation of the shifting cylindrical cam 78 into linear shift motion in the axial direction of the shift pin 82, which is guided by the shifting cam groove 96. When the drive member 74 corresponding to the ratchet grooves 94-1 and 94-2 of the shifting cylindrical cam 78 is rotated counterclockwise by an angle of θ=180°, the shift pin 82 is moved by the shifting amount in the axial direction that is required for switching between the H position and the L position. Furthermore, on the shifting cylindrical cam 78, a check ball 98 pressed by a spring 100 is provided. Check grooves in which the check balls 98 are engaged in are provided at two locations which are shift positions determined by the ratchet grooves 94-1 and 94-2, and the switching positions of the H position and the L position are positioned by the engagement of the check ball 98 with the check grooves.

Figure 7:
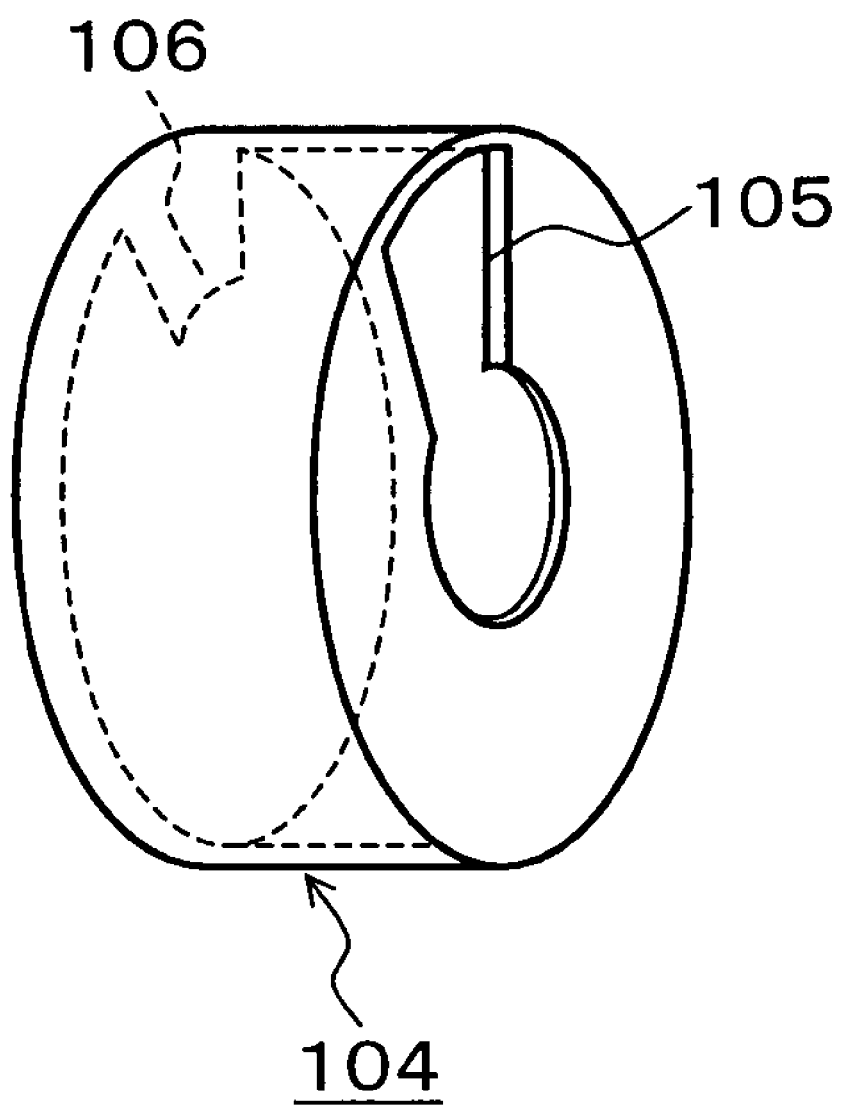
FIG. 7 is an explanatory drawing of a shutter member attached to the shift control mechanism of FIG. 6.

FIG. 7 is an explanatory drawing of a shutter member which is attached to the shift control mechanism 83 of FIG. 6. Upon clutch control in which the drive member 74 is rotated clockwise so as to drive the pinion gear 76, the ratchet 92 is projecting due to the spring. Therefore, although there is no problem in the clockwise rotation since the ratchet passes the ratchet grooves 94-1 and 94-2, in counterclockwise rotation in which the drive member 74 is to be returned to the control starting point, if the ratchet 92 is engaged in the ratchet groove 94-1 or 94-2, the shifting cylindrical cam 78 is erroneously rotated. The shutter member 104 is provided in order to prevent the engagement of the ratchet 92 with the ratchet grooves 94-1 and 94-2 upon rotation of the drive member 74, which is required in control of the clutch control mechanism. The shutter member 104 is attached and fixed to the pinion gear 76 of FIG. 6 and rotatably houses the drive member 74 in the inside thereof. The ratchet 92 is moved to the inside of the shutter 106 by the movement during the period in which the drive member 74 is rotated clockwise until the drive projection 88 abuts the driven projection 90 of the pinion gear 76; consequently, the ratchet is pushed to the inside of the drive member 74. This state is maintained while the drive projection 88 is abutting the driven projection 90 of the pinion gear 76 for multi-plate clutch control; therefore, engagement with the ratchet grooves 94-1 and 94-2 of the shifting cylindrical cam 78, which is stopped during clutch control, can be prevented.

Figure 8:
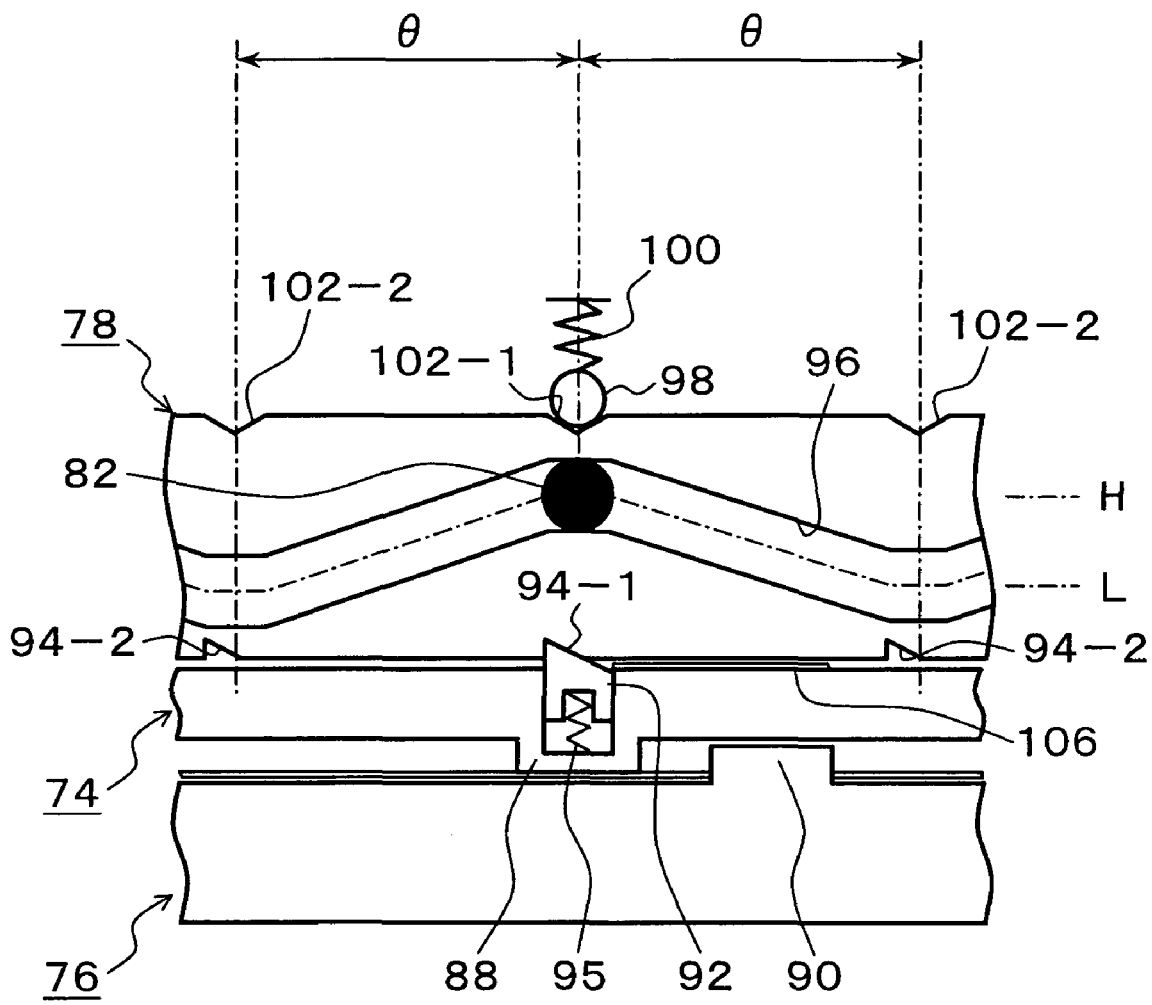
FIG. 8 is an explanatory drawing of an assembled state of the clutch control mechanism and the shift control mechanism of FIG. 6.

FIG. 8 is an explanatory drawing of an assembled state of the clutch control mechanism 84 and the shift control mechanism 83 of FIG. 6. In FIG. 8, the axial direction of the motor output shaft 72 is the vertical direction of the sheet, and the pinion gear 76, the drive member 74, and the shifting cylindrical cam 78 are disposed in the axial direction sequentially from the side in which the motor is positioned. The drive member 74 is positioned between the pinion gear 76 and the shifting cylindrical cam 78 and fixed to the motor output shaft 72, which is not shown. The drive projection 88 is provided on the end face of the drive member 74 in the pinion gear 76-side, and, corresponding to that, the driven projection 90 is provided on the pinion gear 76. FIG. 8 shows the state that the motor output shaft is at the control starting point. At the control starting point, there is a gap between the drive projection 88 of the drive member 74 and the driven projection 90 of the pinion gear 76, and the position at which the drive member 74 is rotated clockwise and the drive projection 88 abuts the driven projection 90 is a control starting position in the clutch control mechanism 84. On the outer periphery of the drive member 74 opposed to the shifting cylindrical cam 78, the ratchet 92 is provided so that the ratchet is energized by the spring 95 and can be extended/retracted. On the end face of the shifting cylindrical cam 78 opposed to the ratchet 92, the ratchet grooves 94-1 and 94-2 are formed. On the outer periphery surface of the shifting cylindrical cam 78, the shifting cam groove 96 is formed, and the shift pin 82 is movably engaged therein. The check ball 98 receives the pressing force of the spring 100 and is attached to and engaged with the check groove 102-1 of the shifting cylindrical cam 78. The position of the shift pin 82 thereat is the control starting point in the shift control mechanism 86, and the shift position is, for example, at the H position. The groove of the shifting cam groove 96 is formed so that, starting from the control starting point determined by the check ball 98, the shift pin 82 is moved in the axial direction from the H position to the L position by the counterclockwise rotation of 180° corresponding to the number of switching levels N=2. Note that, in practice, the shifting cylindrical cam 78 is developed by θ=180° in the left and right, that is, the range of 360° from the control starting point determined by the check ball 98; however, in FIG. 8, in order to simplify the explanation, the part exceeding θ=180° in the left and right is also continuously shown as a developed shape of the shifting cylindrical cam 78. In other words, in this case of the present embodiment, although two check grooves 102-2 positioned on both sides of the check groove 102-1 is originally the same one, they are separately shown as a developed drawing. The shutter member 104 is fixed by engaging an engagement notch 105 with the driven projection 90 of the pinion gear 76 as shown in FIG. 7, and the member is disposed and fixed so that, at the shown position of the control starting point, the shutter 106 formed on the end face that is in the opposite side of the shutter member 104 is positioned in the right side of the ratchet 92 provided on the drive member.

FIGS. 9A and 9B are explanatory drawings of clutch control in FIG. 8. FIG. 9A shows the state of the control starting point that is same as FIG. 8, and the shift pin 82 is, for example, at the H position at this control starting point. When clutch control is to be performed in the state of the control starting point of FIG. 9A, the motor output shaft is rotated clockwise by the motor. In the clockwise rotation, the drive member 74 is moved toward the right in the shown development drawing. When the drive member 74 is moved toward the right, the drive projection 88 abuts the driven projection 90 and rotates the pinion gear 76 clockwise, and the ball cam mechanism 32 is operated via the drive gear 40 shown in FIG. 3. Consequently, the pressing force of the friction clutch 26 is increased corresponding to the amount of rotation. FIG. 9B shows the state of clutch control. When, in the state in which the drive projection 88 of the drive member 74 abuts the driven member 90 of the pinion gear 76, the drive member is moved toward the right as shown by an arrow 107, the clutch pressing force can be increased, and the clutch pressing force can be reduced when the member is returned to the left. In this state of clutch control, the ratchet 92 is retracted to the inside of the shutter 106, and projection thereof is prevented. Therefore, even when the drive member 74 is rotated upon clutch control, the ratchet 92 is reliably prevented from being engaged with the ratchet groove 94-1 or 94-2 formed in the shifting cylindrical cam 78-side and from rotating.

Figure 10A:
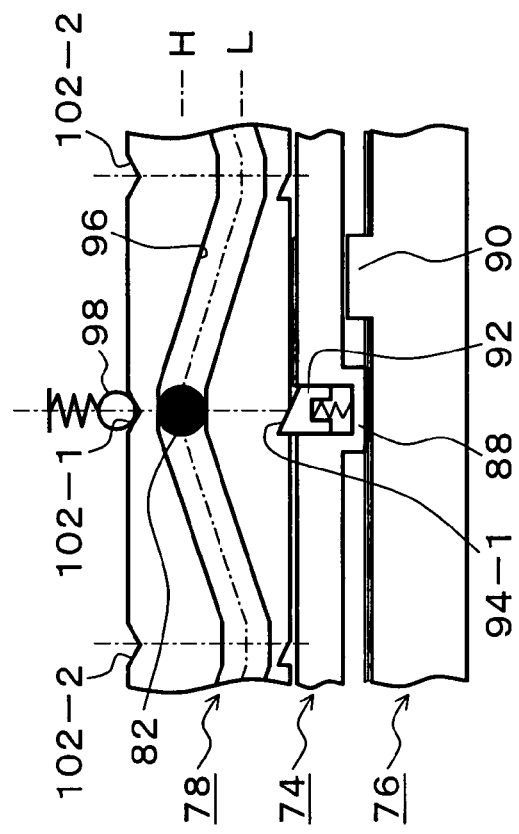
FIGS. 10A to 10D are explanatory drawings of shift control in FIG. 8.
Figure 10B:
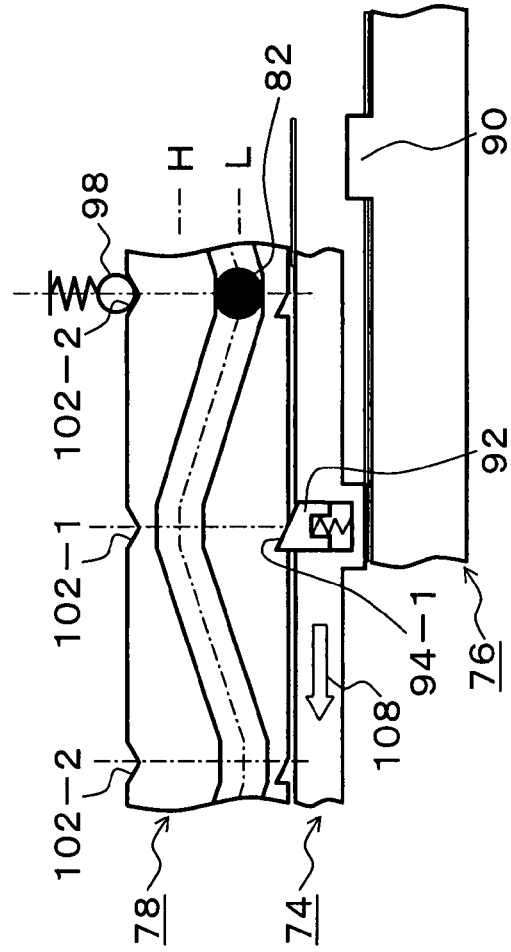
Figure 10C:
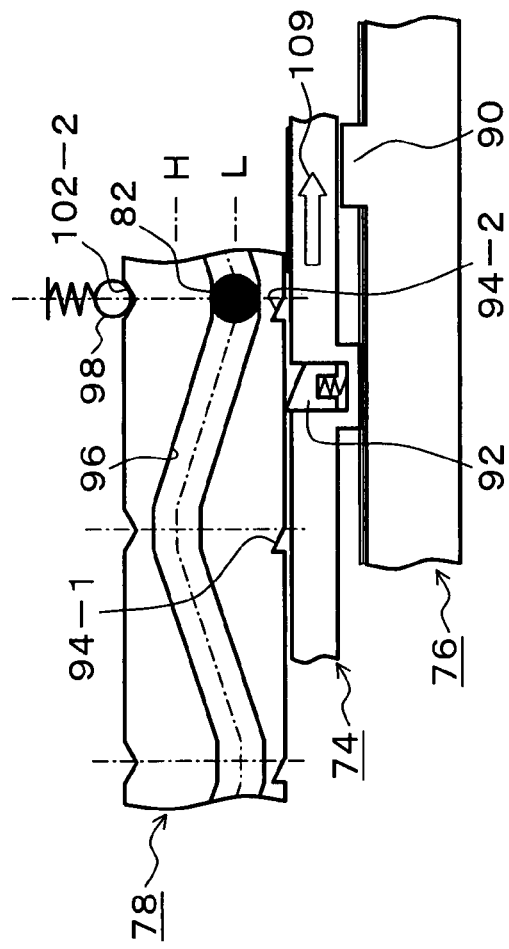
Figure 10D:
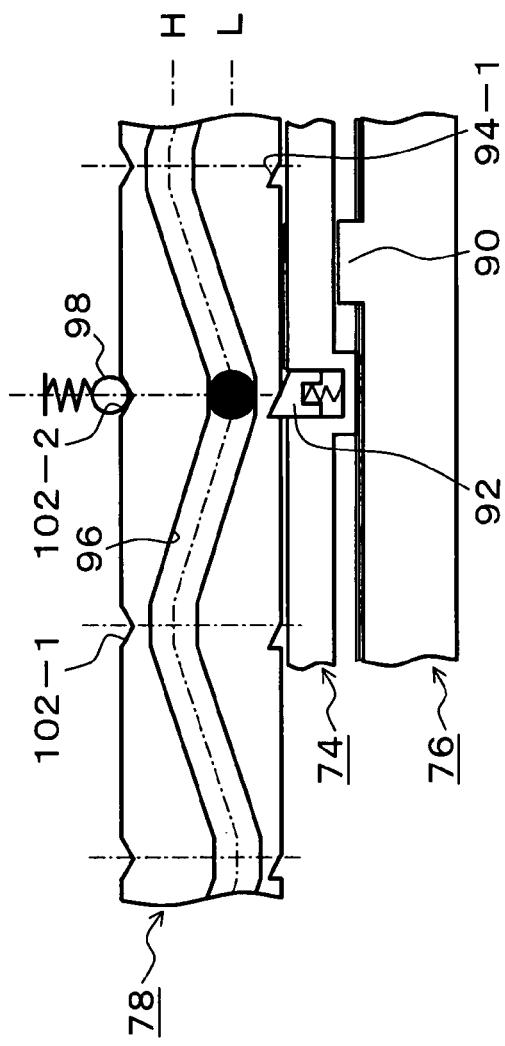

FIGS. 10A to 10D are explanatory drawings of shift control in the embodiment of FIG. 8. FIG. 10A shows the control starting point, and the shift pin 82 is positioned at the H position in this example. In this state, the drive member 74 is rotated counterclockwise by the motor output shaft. By the counterclockwise rotation, the drive member 74 is moved toward the left in the shown development drawing. FIG. 10B shows forward rotation of shift switching in which the drive member 74 is rotated counterclockwise as shown by an arrow 108, wherein the ratchet 92 provided on the drive member 74 is integrally rotated in the state in which the ratchet is engaged with the ratchet groove 94-1 of the shifting cylindrical cam 78. When the rotation angle reaches θ=180°, the check ball 98 is engaged with the check groove 102-2 as shown in the drawing, thereby performing positioning to the switched position. The shift pin 82 at this point is guided in the axial direction along the shifting cam groove 96 and moved to the L position. Subsequently, as shown in FIG. 10C, the drive member 74 is rotated backward in the opposite direction and returned to the control starting point. In the backward rotation of the drive member 74, the ratchet 92 is removed from the ratchet groove 94-1, and merely the drive member 74 is rotated to return to the starting position as shown by an arrow 109 while the shifting cylindrical cam 78 remains at the switched position. FIG. 10D shows shift switch end, wherein the drive member 74 is returned to the control starting point, and the ratchet 92 of the drive member 74 is engaged with the next ratchet groove 94-2. When the drive member 74 is rotated forward counterclockwise again as shown in FIG. 10B after the shift switch end of FIG. 10D and subsequently rotated backward as shown in FIG. 10C, it is switched from the L position the original H position and returned to the starting position again in the return rotation. Note that, in the embodiment of the clutch control mechanism and the shift control mechanism of FIG. 8, when the shift operation is stopped and the drive member 74 is returned to the control starting point before the forward rotation for shift switching from the control starting point of FIG. 10A to FIG. 10B is finished, the shifting cylindrical cam 78 remains at an intermediate position at which the rotation direction is switched and does not return to the control starting point. Therefore, in the present embodiment, for the shift switching performed by counterclockwise rotation of the drive member 74, interlocking has to be mechanically or electrically performed so that shifting can be cancelled when 180° counterclockwise rotation and 180° return rotation thereafter is completed without stopping the rotation in the middle of the range of 180° by motor drive.

Figure 11:
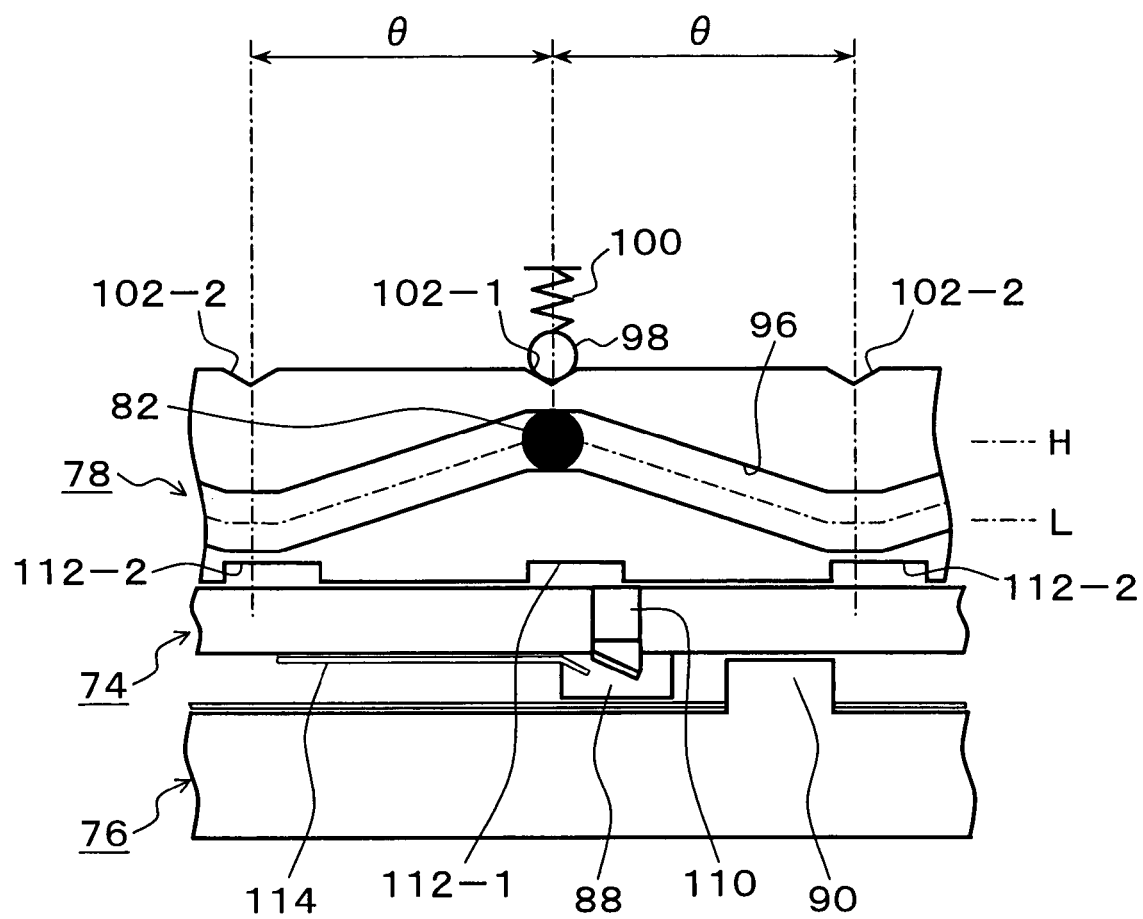
FIG. 11 is an explanatory drawing of another embodiment of the clutch control mechanism and the shift control mechanism of FIG. 3.

FIG. 11 is another embodiment of the shift control mechanism and the clutch control mechanism of FIG. 3, and this embodiment is characterized in that the shifting cylindrical cam 78 is returned to the control starting point when shifting is cancelled during counterclockwise rotation which is caused along with shift control. In FIG. 11, the pinion gear 76 and the shifting cylindrical cam 78 are rotatably disposed in both sides of the drive member 74, which is fixed to the motor output shaft. The drive projection 88 is provided on the drive member 74, and, corresponding to that, the driven projection 90 is provided on the pinion gear 76. In the drive member 74, a slide key 110 is provided slidably in the axial direction, and the slide key 110 is retained at a shown initial position by a built-in spring. The shifting cam groove 96 is formed on the outer periphery of the shifting cylindrical cam 78, the shift pin 82 is guidably engaged therein, and the check grooves 102-1 and 102-2 are provided at two locations corresponding to the shift positions. In the present embodiment, the check ball 98 is engaged with the check groove 102-1, which is serving as the H position, by the spring 100. On the end face of the shifting cylindrical cam 78 opposed to the drive member 74, engagement grooves 112-1 and 112-2 are formed, and the slide key 110 is at a position away from the engagement groove 112-1 at the shown control starting point. A shift control plate 114 fixed to the pinion gear 76-side is provided for the drive member 74. A portion of the shift control plate 114 is positioned on an end face portion of the drive member 74, and the plate has a structure that can cause the shifting cylindrical cam 78 to return to the control starting point when it is to be returned during a shift operation by guiding the slide key 110 by using the inside and outside of the shift control plate 114 with respect to counterclockwise rotation of the drive member 74 for shift control.

Figure 12A:
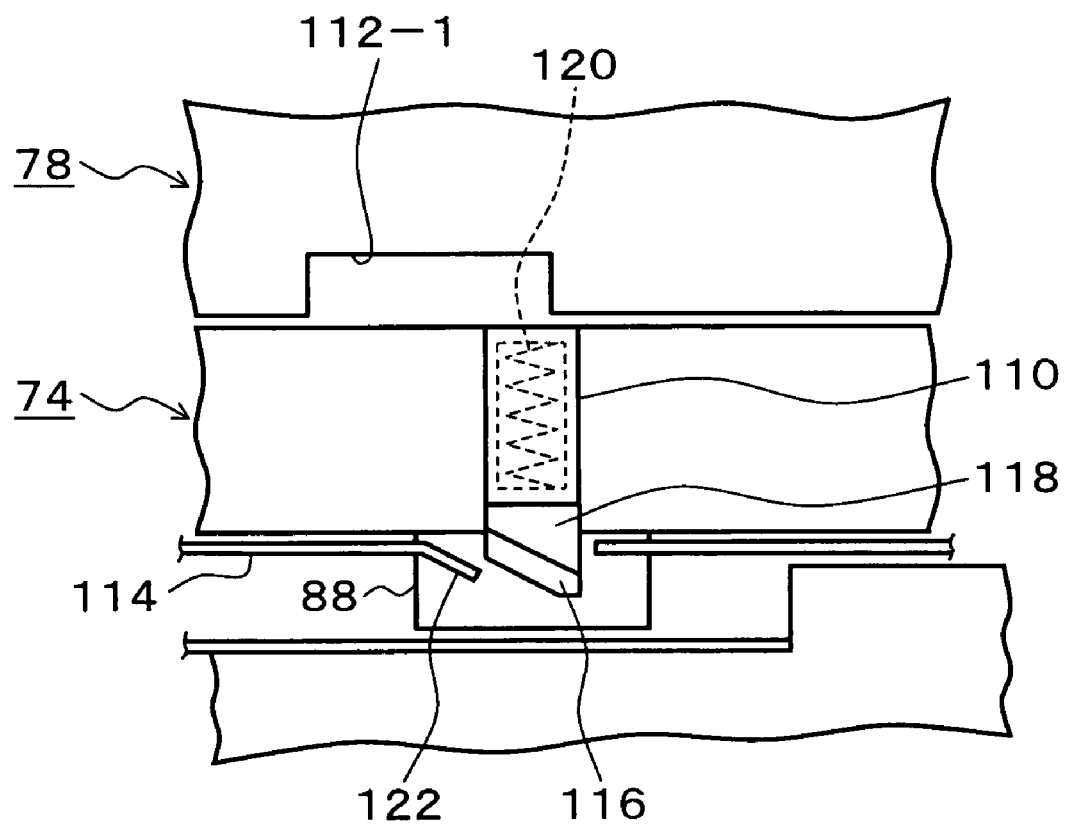
FIGS. 12A to 12C are explanatory drawings showing details of a slide key and a shift control plate of FIG. 11.
Figure 12B:
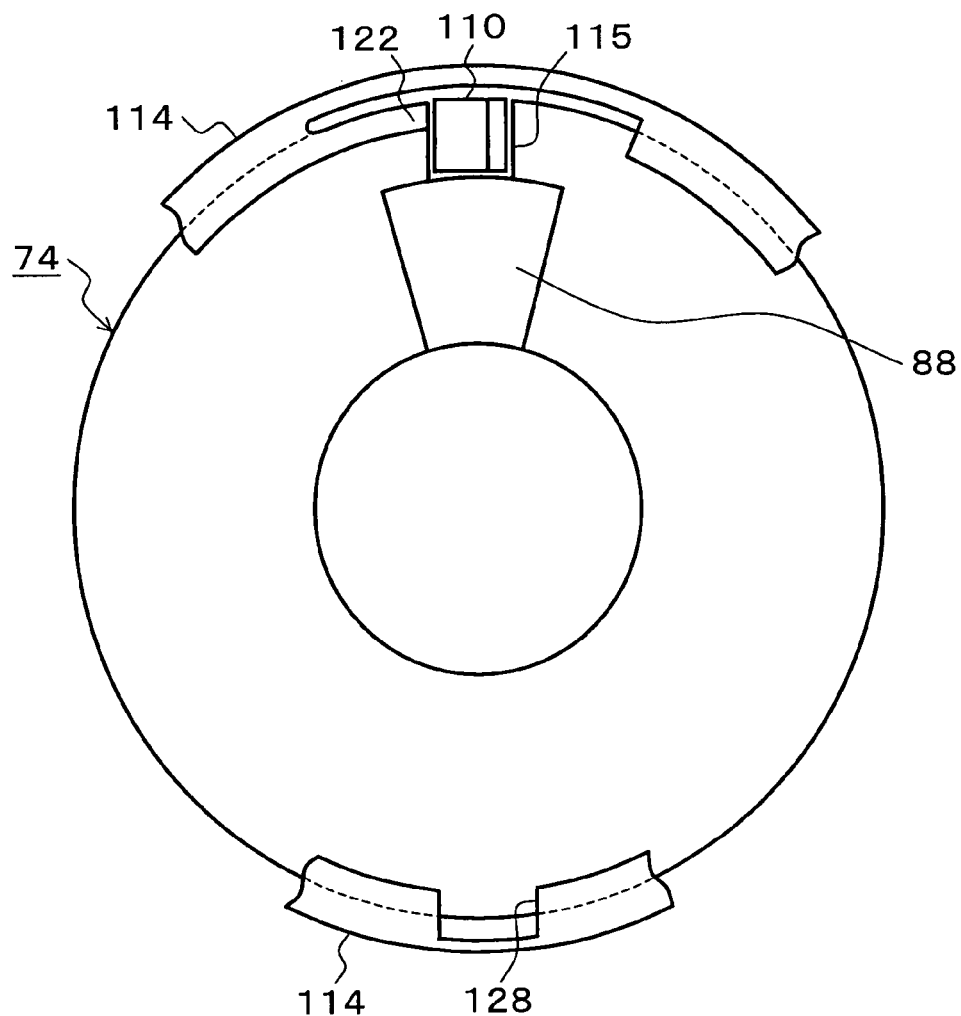
Figure 12C:
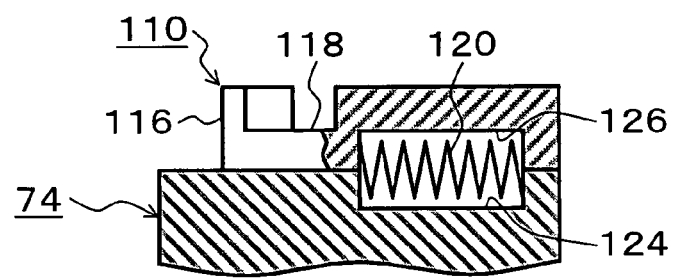

FIGS. 12A to 12C are explanatory drawings showing details of the slide key 110 and the shift control plate 114. FIG. 12A is an enlarged view of the shift slide key 110 of the drive member 74 and the shift control plate 114 provided in the pinion gear 76-side. The slide key 110 is retained at a shown neutral position by the built-in spring 120 and is extended or retracted when it is guided by the shift control plate 114. In the shift control plate 114, a guide portion 122 which is outwardly bent at the distal end of the shown control starting point is provided. When the slide key 110, which is rotated counterclockwise for shift control of the drive member 74, is received by the guide portion 122 and moved along the guide portion 122, a key distal end 116 of the slide key 110 is pushed in, and the other side thereof is projected into the engagement groove 112-1 of the shifting cylindrical cam 78. FIG. 12B shows the end face of the drive member 74 together with a part of the shift control plate 114. The slide key 110 is incorporated in a key groove 115 provided on the outer periphery of the drive member 74 so as to be movable in the axial direction. At the control starting point, the guide portion 122 of the shift control plate 114 is positioned to be outwardly projected in the left side of the slide key 110, and, when the drive member 74 is rotated counterclockwise, the slide key 110 is pushed in along with the guide portion 122. On the other hand, at a position on the shift control plate 114 that is rotated by θ=180° therefrom, an opening 128 is formed. When the slide key 110 guided and moved by the drive member 74 toward the backside surface of the shift control plate 114 is projected from the opening 128 and returns to the initial position when it is rotated to the shift position of the opening 128. FIG. 12C shows a cross sectional structure of the slide key 110 with respect to the drive member 74, wherein an escape groove 118 is formed in the back of the key distal end 116-side in the slide key 110. A spring housing portion 124 is formed in the key groove 115-side of the drive member 74, and a spring housing portion 126 is also formed in the slide key 110-side. The spring 120 is incorporated in the spring housing portions 124 and 126 formed by a combination of them. The slide key 110 is moved when receiving pressing force in the left or right direction; however, by virtue of incorporation of the spring 120, it is returned to the shown initial position determined by the spring 120 when the pressing force is released.

Figure 13:
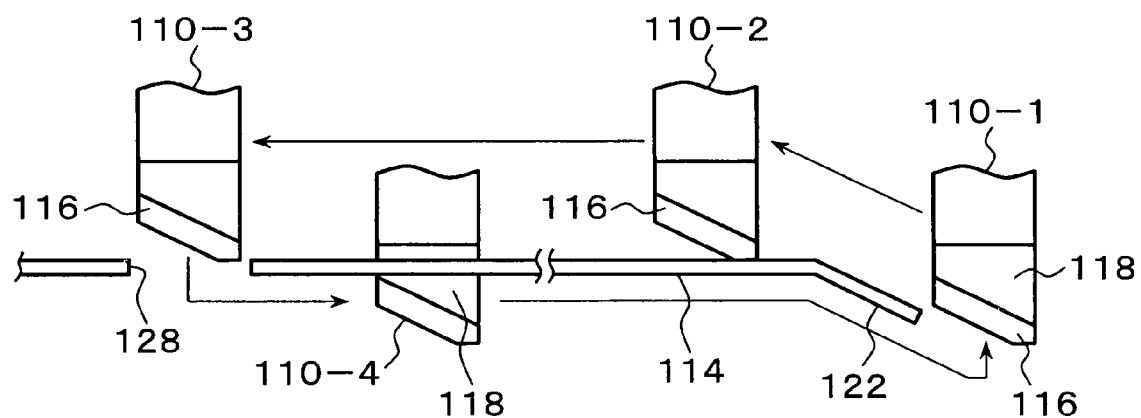
FIG. 13 is an explanatory drawing showing movement of the slide key with respect to the shift control plate of FIGS. 12A to 12C.

FIG. 13 is an explanatory drawing showing movement along with the shift control of the slide key 110 with respect to the shift control plate 114 of FIGS. 12A to 12C. In FIG. 13, the drive member 74 is omitted, and movement of the slide key 110 caused along with counterclockwise rotation and return rotation of the drive member 74 is shown separately in four stages of slide keys 110-1 to 110-4. First of all, at the control starting point, the slide key is at the position shown by the slide key 110-1. When the drive member 74 is rotated counterclockwise in this state for shift operation, the key distal end 116 abuts the guide portion 122 of the shift control plate 114, and the slide key is moved to the position of the slide key 110-2 along the guide portion 122. In other words, the slide key 110-1 is pushed into the key groove of the drive member 74, and the other side is engaged in the engagement groove 112-1 of the shifting cylindrical cam 78 shown in FIG. 12A. Furthermore, when the drive member 74 is rotated, the slide key is moved from the position of the slide key 110-2 to that of the slide key 110-3. This position is a shift switched position, and the opening 128 is provided in the shift control plate 114 at the shift switched position; therefore, the slide key 110-3 is caused to return to the initial position same as the slide key 110-1 via the opening 128 by the force of the spring. When the key distal end 116 of the slide key 110-3 is projected through the opening 128, the shift control plate 114 is positioned at the part of the escape groove 118 in the back thereof. Therefore, when backward rotation of returning the drive member in the opposite direction from the position of the slide key 110-3, which is the shift switched position, is performed, as shown by the slide key 110-4, the shift control plate 114 is positioned in the escape groove 118 in the slide key 110-4. When the slide key is returned to the initial position, the key can be returned to the slide key 110-1, which is the control starting point. As is clear from such movement of the slide keys 110-1 to 110-4 caused by the shift control plate 114, when shifting is cancelled and the drive member is to return to the starting position during shift switching in which the slide key moves from the slide key 110-1 to the slide key 110-3, which is the shift position, since the slide key is in the state pushed-in by the shift control plate 114 like the slide key 110-2, the engagement state with the engagement groove 112-1 of the shifting cylindrical cam 78 of FIG. 12A is maintained in this pushed-in state, and the shifting cylindrical cam 78 can be also integrally return to the control starting point by return of the drive member 74 during the shift switching.

Figure 14A:
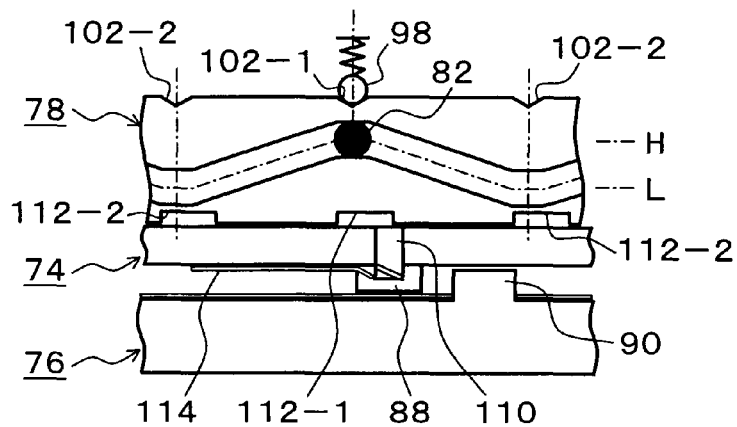
FIGS. 14A to 14C are explanatory drawings of clutch control in FIG. 11.
Figure 14B:
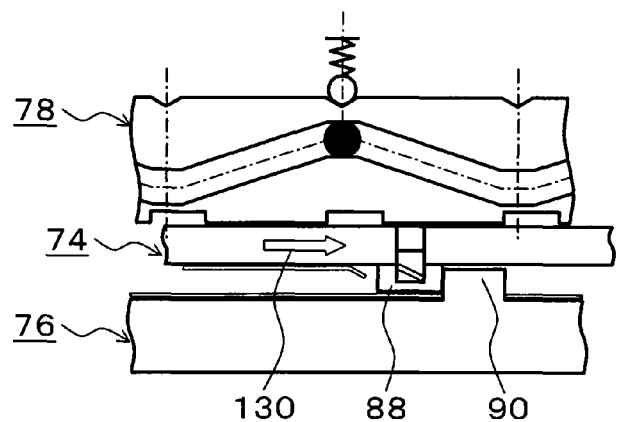
Figure 14C:
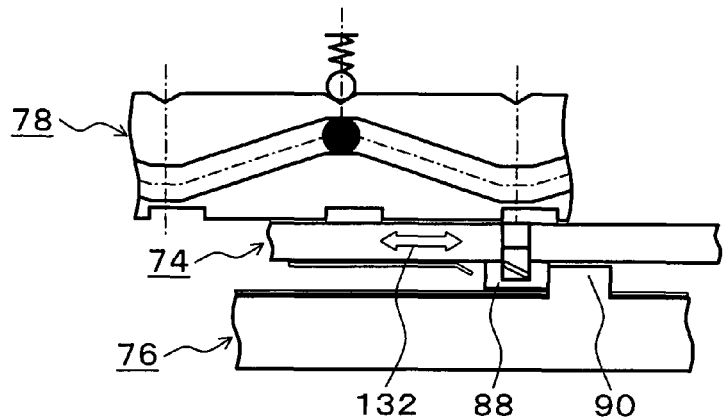

FIGS. 14A to 14C are explanatory drawings of clutch control in the embodiment of FIG. 11. FIG. 14A shows a control starting point. When the drive member 74 is rotated clockwise in this state, the drive projection 88 of the drive member 74 abuts the driven projection 90 of the pinion gear 76 as shown in FIG. 14B, and the pinion gear 76 is rotated clockwise, thereby increasing the clutch pressing force. Furthermore, when the drive member 74 is moved toward the right or left as shown by an arrow 132 of FIG. 14C, the clutch pressing force can be increased by clockwise rotation, or the clutch pressing force can be reduced by counterclockwise rotation.

Figure 15A:
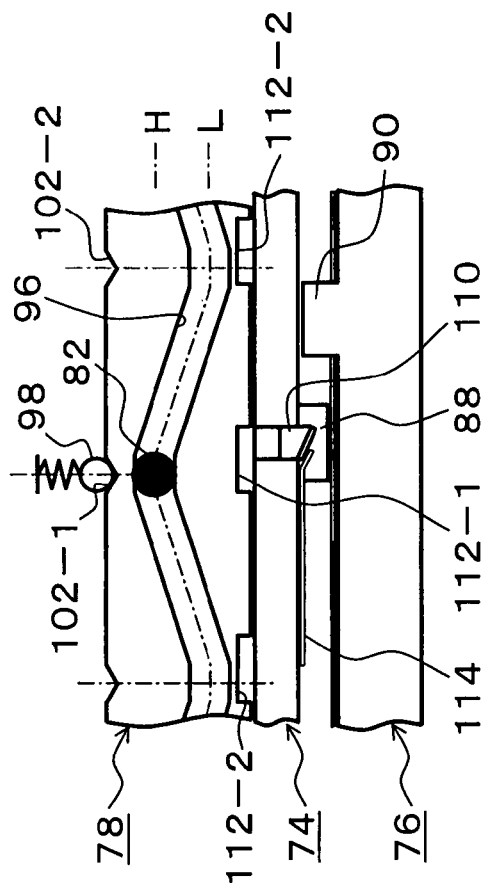
FIGS. 15A to 15C are explanatory drawings of shift control in FIG. 11.
Figure 15B:
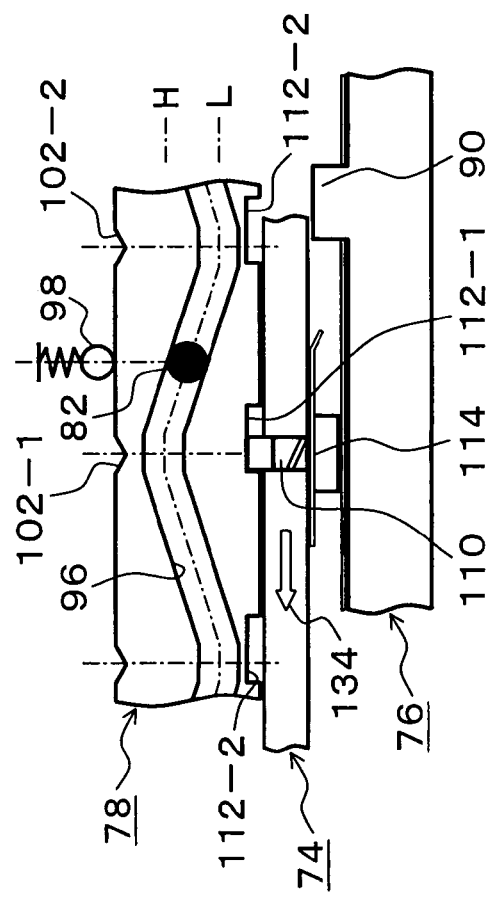
Figure 15C:
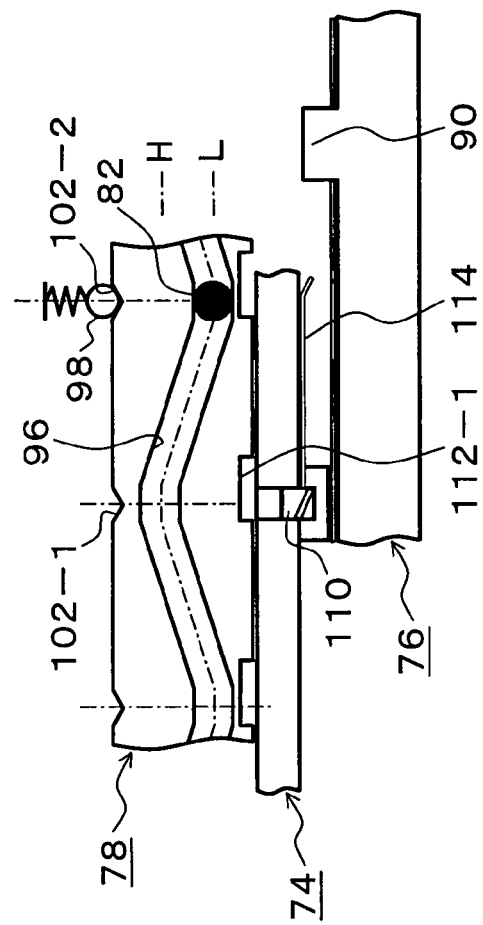
Figure 15D:
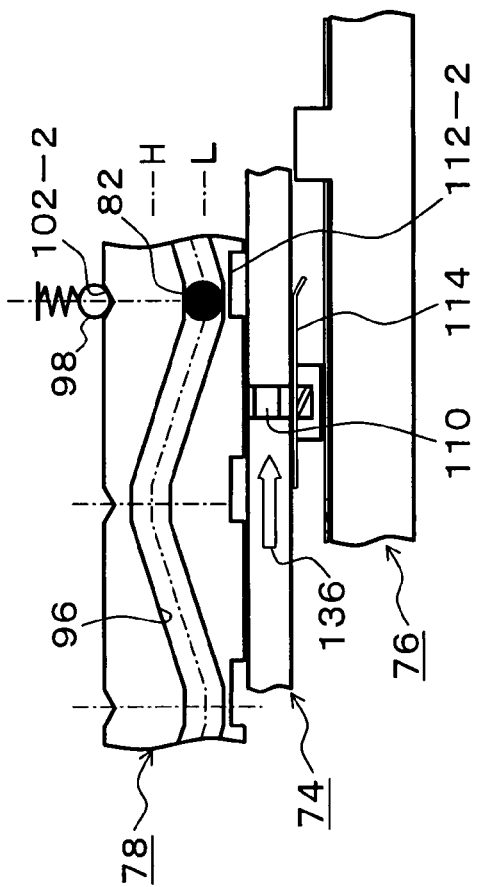

FIGS. 15A to 15F are explanatory drawings of shift control in the embodiment of FIG. 11. FIG. 15A shows a control starting point, wherein the shift pin 82 is at the H position. When the drive member 74 is driven counterclockwise in this state, forward rotation is performed like FIG. 15B as shown by an arrow 134. At this point, the slide key 110 is pushed in by guiding of the shift control plate 114, and the opposite side thereof is engaged with the engagement groove 112-1 of the shifting cylindrical cam 78. Consequently, the shifting cylindrical cam 78 rotated counterclockwise integrally with the drive member 74, and guiding by the shifting cam 96 causes the shift pin 82 to begin to move from the H position to the L position. FIG. 15C shows reach to a shift position, wherein the shift pin 82 is moved to the L position which is determined by attachment and engagement of the check ball 98 with respect to the check groove 102-2. When it reaches the shift position, the slide key 110 is projected from the opening of the shift control plate 114 and returned to the initial position, wherein engagement with the engagement groove 102-1 is cancelled. Subsequently, as shown in FIG. 15D, when return rotation of return from the shift position to the control starting point is performed like an arrow 136, the slide key 110 returns to the control starting point in the state in which the shift control plate 114 is positioned in the part of the back escape groove 118 as shown by the slide key 110-4 of FIG. 13. FIG. 15E shows the state of the return rotation that is during return to the control starting point, wherein the slide key 110 moves over the guide portion 122 (see FIGS. 12A to 12C), which is formed to be bent at the distal end side of the shift control plate 114 and projects. Then, it returns to the initial position again as shown in FIG. 15F and returns to the state of the control starting point, in other words, the initial position of the slide key same as that of FIG. 15A, wherein the shift pin at this point is switched to the L position.

Figure 16A:
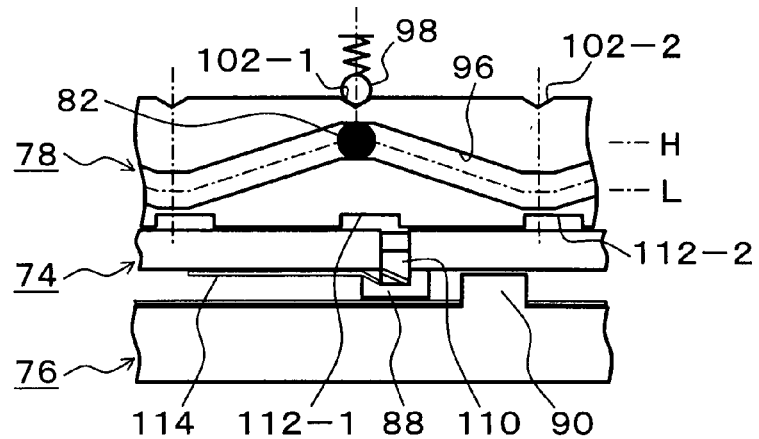
FIGS. 16A to 16E are explanatory drawings of shift control in the case in which return is performed during shifting.
Figure 16B:
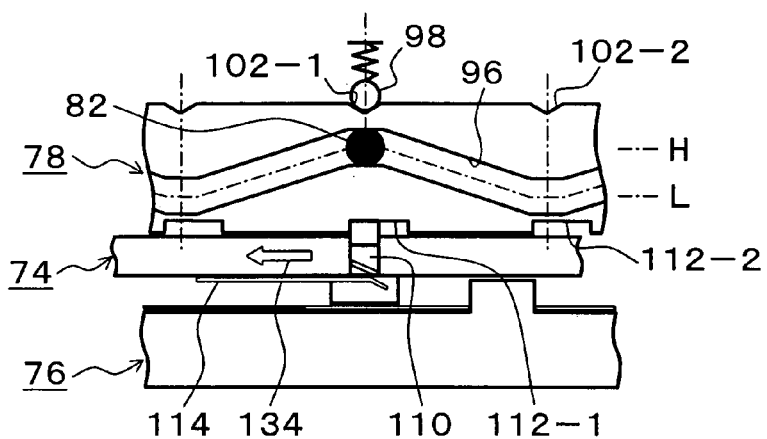
Figure 16C:
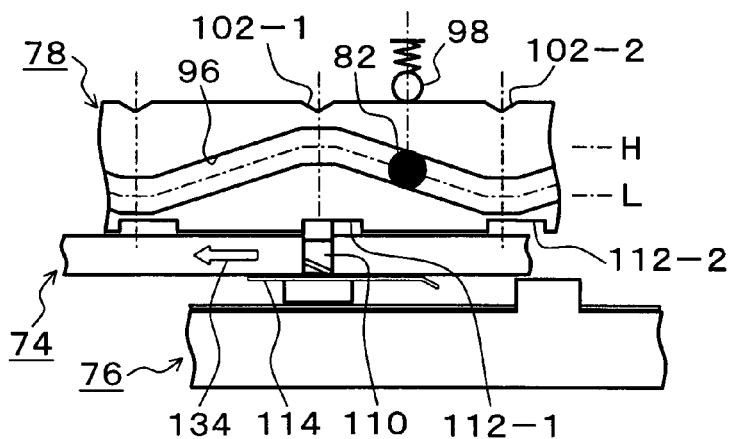
Figure 16D:
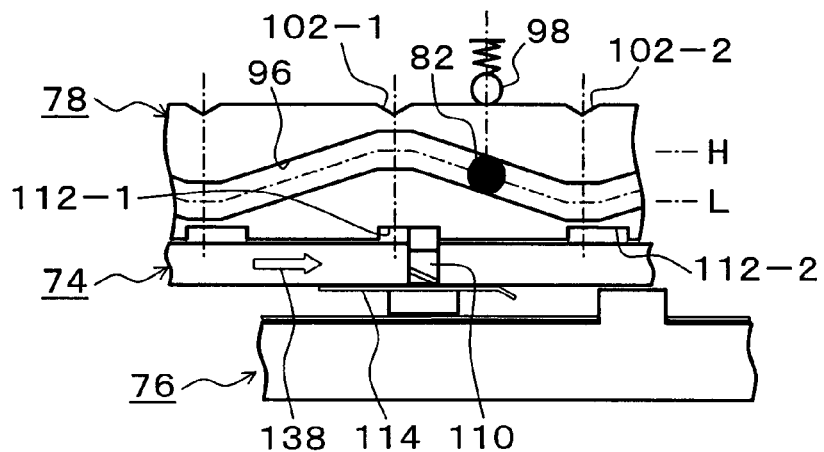
Figure 16E:
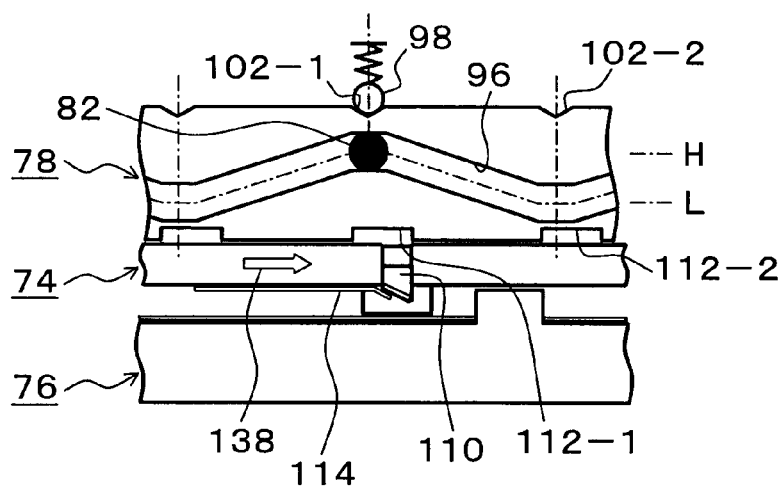

FIGS. 16A to 16E are explanatory drawings of shift control of the case in which the drive shaft is returned during shift in the embodiment of FIG. 11. FIG. 16A shows a control starting point. When the drive member 74 is rotated counterclockwise in this state to perform forward rotation, the state of FIG. 16B is attained. When the drive member is further rotated, the state of FIG. 16C is attained. When the shift is cancelled during the forward rotation of FIG. 16C, since the engaged state with the engagement groove 112-1 of the shifting cylindrical cam 78 is maintained by virtue of the push-in of the slide key 110 along the shift control plate 114, the shifting cylindrical cam 78 also returns to the starting position along with the return rotation of the drive member 74, and, via the position immediately before the check ball 98 is engaged with the check groove 102-1 like FIG. 16E, the state of the control starting point of FIG. 16A is attained again. In such embodiment of FIG. 11, the shifting cylindrical cam can be returned in conjunction with the movement of the drive member 74 even when shifting is cancelled during the shifting. Therefore, for example, with respect to an operation of cancelling shifting due to change in the circumstances although an operator has performed shifting operation by motor drive, for example, by button-pressing operations, shift cancelling control can be appropriately performed by the motor operated in conjunction with a shift cancelling operation during the shift operation. Note that, the above described embodiments take the two-level switching between the H position and the L position as an example as an auxiliary transmission mechanism. However, in the present invention, as switching positions in the auxiliary transmission mechanism, furthermore, addition in the positions, for example, a third position and a fourth position such as neutral and 4WD lock may be readily set. When the number of set positions is increased, since the number of switching levels is N=4, the disposition angle θ for switching is required to be changed to θ=360°/N=360°/4=85°. Even when the number of shift levels of the auxiliary transmission mechanism is increased, and the rotation angle θ of the reciprocating rotation for shift operation is reduced, the rotation angle for shifting is not correlated with the clutch control of the friction clutch which is performed by rotation in the opposite direction. The clutch control can be independently performed by an arbitrary rotation angle, for example, in clockwise rotation for the clutch control. In the embodiment of FIG. 6, a ratchet key comprising the ratchet 92 and the ratchet grooves 94-1 and 94-2 is provided in the shift control mechanism 86. However, the mechanism may have a structure using a so-called ratchet which is a ratchet rotated by a pin as the ratchet 92 instead of the slide structure. The present invention includes arbitrary modifications that do not impair the object and advantages thereof and is not limited by the numerical values shown in the above described embodiments.

What is claimed is:

1. A four-wheel-drive-vehicle driving force distribution apparatus comprising:
   an input shaft;
   a main output shaft;
   an auxiliary output shaft;
   an auxiliary transmission mechanism for switching motive power transmitted to said input shaft at least between a high speed and a low speed, and transmitting the motive power to said main output shaft;
   a friction clutch for selectively transmitting the motive power of said main output shaft to said auxiliary output shaft;
   a motor having an output shaft with a pinion gear rotatably and coaxially disposed on said output shaft of said motor, and having a shifting cylindrical cam rotatably and coaxially disposed on said output shaft of said motor;
   a ball cam mechanism for changing a pressing force of said friction clutch in a non-step manner corresponding to rotation of said pinion gear which is rotatably and coaxially disposed on said output shaft of said motor;
   a shift mechanism for converting rotation of said shifting cylindrical cam which is rotatably and coaxially disposed on said output shaft of said motor into linear shift motion and shifting said auxiliary transmission mechanism;
   a drive member which is fixed to said output shaft of said motor, and configured to be rotated in one of a first direction and a second direction from a control starting point of a rotational direction by said motor;
   a clutch control mechanism disposed between said drive member and said pinion gear for changing a clutch pressing force caused by said ball cam mechanism corresponding to rotation of said drive member in the first direction caused by said motor starting from said control starting point; and
   a shift control mechanism, disposed between said drive member and said shifting cylindrical cam, configured to shift said auxiliary transmission mechanism to a predetermined shift position, wherein shifting of said auxiliary transmission mechanism only occurs when said drive member is rotated from said control starting point in the second direction, after which, said drive member is rotated in the first direction to return to said control starting point, and the shifting is capable of occurring an unlimited number of times without changing the clutch pressing force.

2. The four-wheel-drive-vehicle driving force distribution apparatus according to claim 1, wherein
   in said clutch control mechanism, a drive projection is formed on an end surface of said drive member in the pinion gear-side, a driven projection is formed on an end face of said pinion gear in the drive member-side, said drive projection is configured and arranged to abut the driven projection by rotation of said drive member in the first direction from the control starting point and rotate said pinion gear in the first direction, and said pinion gear is configured to be rotated so as to return by reaction force of said friction clutch in return rotation of said drive member to the control starting point.

3. The four-wheel-drive-vehicle driving force distribution apparatus according to claim 1, wherein
   said shift control mechanism has
   a ratchet attached to said drive member and
   a ratchet groove formed on an end face of said shifting cylindrical cam in the drive member-side; wherein,
   during forward rotation of the drive member in the second direction, said ratchet engages the ratchet groove so as to rotate said shifting cylindrical cam and switch a current shift position to a next shift position; and, in return rotation, said ratchet is removed from said ratchet groove so as to return said drive member to the control starting point while said shifting cylindrical cam remains at the next shift position.

4. The four-wheel-drive-vehicle driving force distribution apparatus according to claim 3, wherein, said shift control mechanism has a shutter member for housing said ratchet so as to prevent engagement between said ratchet and said ratchet groove when said drive member is rotated in the first direction so as to operate said clutch control mechanism.

5. The four-wheel-drive-vehicle driving force distribution apparatus according to claim 3, wherein, when the number of switching levels of said auxiliary transmission mechanism is N, said ratchet groove is provided at N locations at an angle interval of $\theta$ which is 360° divided by the number of switching levels N starting from the control starting point, and an outer peripheral cam groove for changing a shift position by the interval angle $\theta$ is formed on the outer periphery of said shifting cylindrical cam.

6. The four-wheel-drive-vehicle driving force distribution apparatus according to claim 1, wherein said shift control mechanism has
   a slide key attached to said drive member and retained at a retracted position by a built-in spring;
   an engagement groove which is formed on an face of said shifting cylindrical cam in the drive member-side and to be engaged with said slide key; and
   a shift control plate for, in forward rotation of said drive member in the second direction, pressing a rear portion of said slide key so as to rotate said shifting cylindrical cam in a state in which a distal end of said slide key is engaged with said engagement groove so as to switch a current shift position to a next shift position; causing said slide key to return to the retracted position at the next shift position and causing said drive member to return to the control starting point in a state in which said slide key is removed from said slide groove; and, when said drive member is to be returned to the control starting point during the forward rotation to the next shift position, causing said shifting cylindrical cam to return to the control starting point in a state in which engagement between said slide key and said engagement groove is maintained.

7. The four-wheel-drive-vehicle driving force distribution apparatus according to claim 6, wherein, when the number of switching levels of said auxiliary transmission mechanism is N, said engagement groove is provided at N locations on said shifting cylindrical cam end face at an angle interval of $\theta$ which is 360° divided by the number of switching levels N starting from the control starting point, and an outer peripheral cam groove for changing a shift position by the interval angle $\theta$ is formed on the outer periphery of said shifting cylindrical cam.

8. The four-wheel-drive-vehicle driving force distribution apparatus according to claim 1, wherein said shift mechanism has a shift waiting mechanism between said shift control mechanism and said shift mechanism.

* * * * *